(12) United States Patent
Nakajima et al.

(10) Patent No.: US 7,095,696 B2
(45) Date of Patent: Aug. 22, 2006

(54) RECORDING/REPRODUCING DEVICE

(75) Inventors: Takeshi Nakajima, Nara (JP); Harumitsu Miyashita, Mino (JP); Toshiya Akagi, Neyagawa (JP); Shinichi Konishi, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 380 days.

(21) Appl. No.: 10/473,307

(22) PCT Filed: Apr. 5, 2002

(86) PCT No.: PCT/JP02/03471

§ 371 (c)(1),
(2), (4) Date: Sep. 26, 2003

(87) PCT Pub. No.: WO02/084653

PCT Pub. Date: Oct. 24, 2002

(65) Prior Publication Data

US 2004/0095862 A1 May 20, 2004

(30) Foreign Application Priority Data

Apr. 9, 2001 (JP) .............................. 2001-109597

(51) Int. Cl.
*G11B 5/09* (2006.01)

(52) U.S. Cl. .................................................. 369/59.12
(58) Field of Classification Search .................... None
See application file for complete search history.

(56) References Cited

U.S. PATENT DOCUMENTS 6,650,607 B1 * 11/2003 Kando et al. ............. 369/59.24
6,691,072 B1 * 2/2004 Fuke et al. ................... 702/189
6,791,926 B1 * 9/2004 Furumiya et al. ........ 369/53.13

FOREIGN PATENT DOCUMENTS

JP  2000-231719  8/2000

* cited by examiner

*Primary Examiner*—Thang V. Tran
*Assistant Examiner*—Joseph Haley
(74) *Attorney, Agent, or Firm*—Akin Gump Strauss Hauer & Feld, LLP

(57) ABSTRACT

A recording/producing device for writing data on a recording medium, or reading data from the recording medium, wherein data matching a recording pattern so specified as to include a plurality of mutually different sets of mark lengths and space lengths is written on the recording medium, and the data is then read to generate data signals. An edge shift detector uses data signals to measure the edge shift amount of a mark formed on a recording medium for each set of a mark length and a space length. A record controller sets a recording parameter for each set of a mark length and a space length based on the measured edge shift amount.

28 Claims, 21 Drawing Sheets

FIG.3
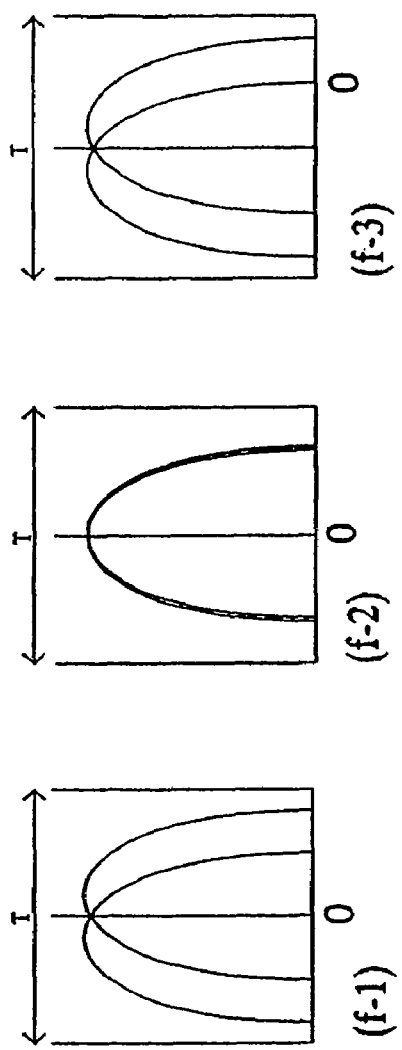
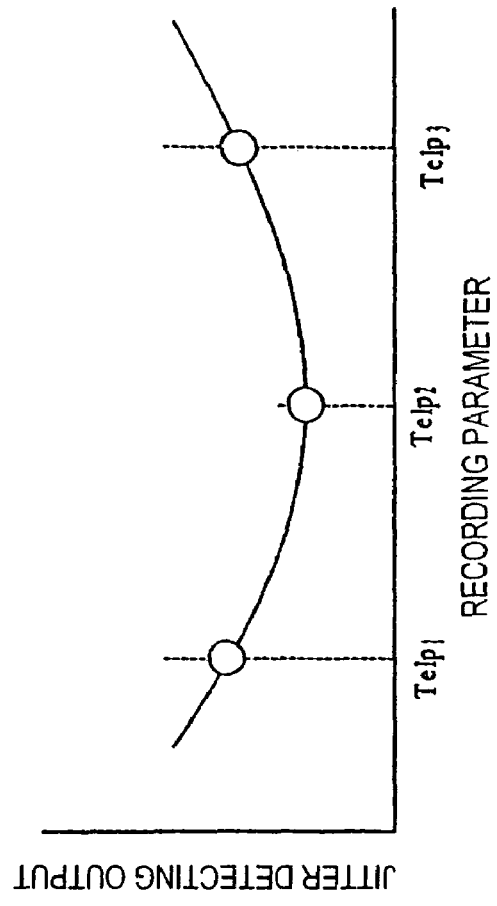
(f) RISE JITTER DISTRIBUTION
(g) JITTER DETECTING OUTPUT
PRIOR ART

FIG.9
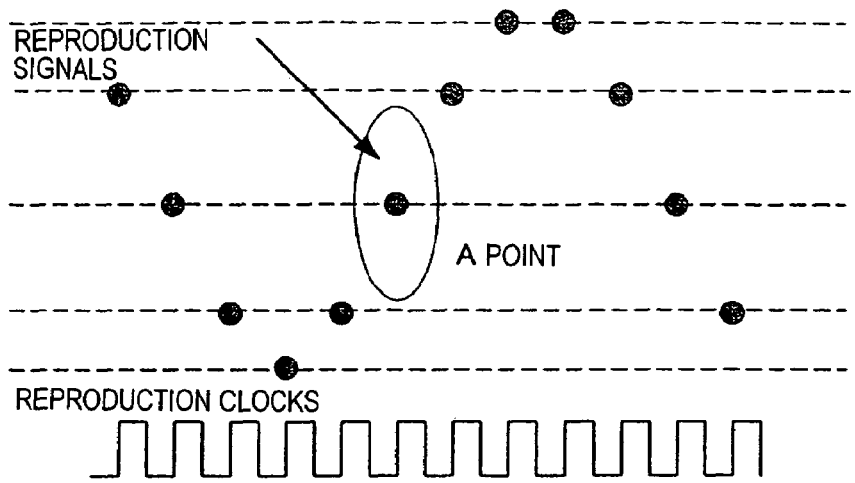
ZERO-CROSS POINT OF RISE EDGE (4T TO 6T)
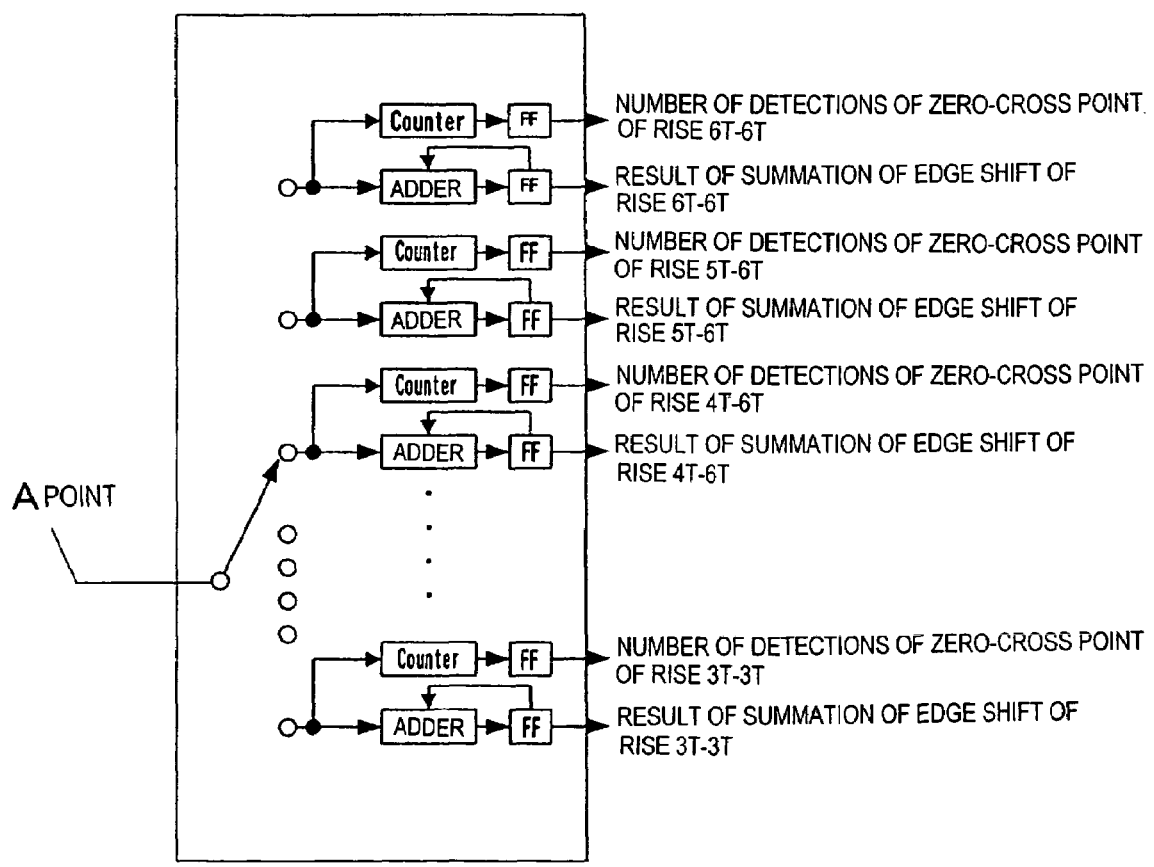

FIG.14

| | REPEATED PATTERN |
|---|---|
| 4m3s4m4s4m5s4m6s3m3s3m4s<br>3m5s3m6s6m3s6m4s6m5s6m6s<br>5m3s5m4s5m5s6m6s | 1111000111100001110000011100001110000111<br>0000011100000011111000111110001111000011111<br>0000011110001111100011111000011111000000 |
| 4m3s4m4s4m6s4m5s3m3s3m4s<br>3m6s3m5s5m3s5m4s5m6s5m5s<br>6m3s6m4s6m6s6m5s | 1111000111100001110000011100001110000111<br>0000011100000011111000111110001111000011111000<br>0011111000111110001111100001111100000 |
| 4m6s4m5s4m4s4m3s6m6s6m5s<br>6m4s6m3s3m6s3m5s3m4s3m3s<br>5m6s5m5s5m4s5m3s | 1111000000111100001111000011111000001111<br>1100001111110000011111100001110000110000<br>1110001111110000111110001111100001111000 |
| 4m6s4m5s4m4s4m3s6m6s6m4s<br>6m5s6m3s3m6s3m4s3m5s3m3s<br>5m6s5m4s5m5s3m3s | 1111000000111100001111100001111100001111<br>1100001111100001111000111100001111100000<br>1110001111110000111110001111100001111000 |
| 4m5s4m6s4m3s4m4s3m5s3m6s<br>3m3s3m4s6m5s6m6s6m3s5m4s<br>5m5s5m6s5m3s5m4s | 1111000001111000011110000111000011100000<br>0111000111100000111110000011111000110000<br>1100001111110000111110001111100011111000 |

FIG. 15

| | REPEATED PATTERN |
|---|---|
| 4m3s4m4s4m5s4m8s3m3s3m4s<br>3m5s3m8s8m3s8m4s8m5s8m8s<br>5m3s5m4s5m5s5m8s | 1110001110000111000011100001110001110000111100001111110<br>110000111000000001111111000011111110000111111100001111110<br>0000111111100000000011111110001111110001111110000011111<br>1100000000 |
| 4m3s4m4s4m8s4m5s3m3s3m4s<br>3m8s3m5s5m3s5m4s5m8s5m5s<br>8m3s8m4s8m8s8m5s | 1110001110000111000000011100001110001110000111100001111<br>110000001110000011100000011111100001111111000000000111<br>110000011111111000011111110001111111100000000011111111<br>1111100000 |
| 4m8s4m5s4m4s4m3s8m8s8m5s<br>8m4s8m3s3m8s3m5s3m4s3m3s<br>5m8s5m5s5m4s5m3s | 11110000000011100000111000011100001110001111111100000<br>0011111110000011111110001111111000011110001110011000000<br>1100000111000011100001111000011110000011111110000011110<br>0011111000 |
| 4m8s4m4s4m5s4m3s8m8s8m4s<br>8m5s8m3s3m3s3m4s3m5s3m8s<br>5m8s5m4s5m5s5m3s | 11110000000011100001110000111100001110001111100001110<br>0011111110000011111111000011111111000011110001110000001<br>110000111000011100000111000011110000011111000011110000<br>0011111000 |
| 4m5s4m8s4m3s4m4s3m5s3m8s<br>3m3s3m4s8m5s8m8s8m3s8m4s<br>5m5s5m8s5m3s5m4s | 11110000011110000111000000000011110001110000111100001110<br>000011100011110000111111111110000111111110000000000111<br>1111000111111111111000000001111110000000000011111000111<br>0111110000 |

RECORDING/REPRODUCING DEVICE

CROSS-REFERENCE TO RELATED APPLICATION

This application is a Section 371 of International Application No. PCT/JP02/03471, filed Apr. 5, 2002, the disclosure of which is incorporated herein by reference.

TECHNICAL FIELD

The present invention relates to a device for recording information on a recording medium such as an optical disk and reproducing information from the recording medium.

BACKGROUND ART

Currently, a recording/reproducing device for recording digital information (data) on a portable recoding medium such as an optical disk or magneto-optical disk, and reproducing digital information from the recording medium is widely used. In a recording/reproducing device for recording information in a DVD-RAM using laser beams, for example, a plurality of marks and spaces having different lengths are formed on an optical disk according to data to be recorded. The marks and spaces formed on the optical disk are read using laser beams, whereby the data is reproduced.

However, even when data is written using laser beams having the same laser power or pulse waveform, shapes of marks formed on the recording medium may vary due to individual differences between devices and between recording media. If the shape of the mark is deviated from a desired shape, the waveform of a read reproduction signal is deviated from an original waveform, resulting in degradation of reproduction quality. Thus, the recording/reproducing device has a problem such that the quality of a reproduction signal when data recorded on the recording medium is reproduced may significantly vary depending on the device or the recording medium.

For preventing such deterioration in reliability of the reproduction signal, test recording is conducted in loading a recording medium in the recording/reproducing device or in doing other operations. Specifically, predetermined data is recorded in a predetermined area on the recording medium, and this recorded data is reproduced to check signal quality. Based on the results, the recording/reproducing device optimizes the characteristics of a reproduction system, and optimizes a parameter for recording (recording parameter).

It is to be noted that, in this specification, the recording parameter means, in a broad sense, a parameter specifying a recording operation of the device, capable of changing the shape of a mark formed on the recording medium. Typically, the recording parameter is a parameter specifying the waveform of a recording pulse that is used when an optical disk or the like is irradiated with a laser beam (e.g. pulse width, pulse edge position, etc.).

Particularly, in a recording medium in which information is recorded by heat resulting from irradiation of a laser beam such as an optical disk, a mark having an undesired shape (i.e. mark shifted in edge position) is easily formed due to heat interference. The degree of the heat interference varies depending on the pattern of marks and spaces formed on the recording medium. Therefore, if such a recoding medium is used, an optimum parameter is preferably set according to the above pattern.

In test recording, the quality of the reproduction signal is determined based on, for example, jitter (swing of reproduction signal along the direction of the time axis). FIG. 1 shows a conventional optical disk drive 900 optimizing the characteristics of the reproduction system or the recording parameter so that the jitter of the reproduction signal is minimized.

The optical disk drive 900 has an optical head 2 for writing information on an optical disk 1 or reading information from the optical disk 1. When data is read, reflection of light irradiated onto the optical disk 1 (reflected light) is converted into a reproduction signal matching the recorded data in the optical head 2.

The reproduction signal is waveform-shaped by a waveform equalizer 3, and then binarized by a comparator 4. The threshold (slice level) of this comparator 4 is feedback-controlled by an integration circuit or the like (not shown) so that the integral of a binarized output from the comparator 4 equals 0. This is because a recording method such that the integral of a reproduction signal equals 0 is usually employed, and undesired variations in the reproduction signal caused by external factors (e.g. variations in reflectivity of the recording medium, etc.) are inhibited taking advantage of the fact that the reproduction signal ideally has no direct current components (i.e. DC free).

Then, in a phase comparator 5, a phase difference between the binarized output from the comparator 4 and a reproduction clock signal is measured. The reproduction clock signal is extracted from clock information included in a reproduction signal by a PLL (phase locked loop) circuit. More specifically, the phase difference detected in the phase comparator 5 is averaged by an LPF (low-pass filter) 6, and this is used as a control voltage of a VCO (voltage-controlled oscillator) 7. At this time, the oscillation frequency of the VCO 7 and the phase of the outputted signal are feedback-controlled so that the cumulative amount of the phase difference outputted from the phase comparator 5 equals 0. Consequently, a reproduction clock signal synchronized with the reproduction signal is outputted from the VCO 7.

However, even when a reproduction clock signal generated using the PLL circuit, there arises a phase difference between the binarized signal and the reproduction clock signal if an undesired deviation (shift) exists in the edge of a formed mark, and the length of the mark is not ideal length. In the optical disk drive 900, the jitter of the reproduction signal is measured based on this phase difference. The operation for correcting the recording parameter in the optical disk drive 900 will be more specifically described below.

First, a record compensation circuit 9 generates a recording pulse signal according to an initialized recording parameter and a predetermined recording pattern outputted from a pattern generation circuit 8. Using this recording pulse signal, a laser drive circuit 10 records data matching the predetermined recording pattern on the optical disk 1.

Then, a track on the optical disk 1 in which the data is recorded is read. At this time, a difference detection circuit 11 receives from the phase difference comparator 5 a phase difference between the output of the comparator 4 (binarized signal) and the output of the VCO 7 (reproduction clock signal), and integrates the absolute value of the phase difference. In this way, the difference detection circuit 11 integrates the absolute value of the phase difference to measure a value (jitter amount) having a correlation with the jitter, and outputs the value.

The reason why the absolute value of the phase difference is integrated in this way is that the jitter represents a degree of spread of deviation (variation) in the reproduction signal.

Thus, for obtaining a value having a correlation with the jitter, a phase difference should be added while ignoring signs (polarity).

Based on the jitter amount obtained in this way, the optical disk drive 900 can determine whether the recording parameter used is appropriate or not. A large jitter amount detected means that the recording parameter is not appropriate.

In addition, for optimizing the recording parameter, the optical disk drive 900 repeats the above described operation while changing the value thereof. Consequently, a jitter amount matching each recording parameter is detected. Among these parameters, a recording parameter allowing the jitter amount to be minimized is selected to optimize the recording parameter.

The procedure for optimizing the recording parameter based on measurement of the jitter of the reproduction signal will be described in detail below with reference to FIGS. 2 and 3. A procedure will be described as an example below in which by carrying out test recording using a recording pattern specified by a 6T space, a 4T mark, a 6T space and a 8T mark, a recording parameter specifying the position of an edge behind the 4T mark (hereinafter referred to as a trailing edge) is optimized. It is to be noted that, in this specification, if the polarity inversion period (pulse width) of a recording pattern matching a mark or space formed on the recording medium is mT (m is an integer of 1 or greater, and T is a clock period), the mark or space may be referred to as an mT mark or mT space. In addition, because the above polarity inversion period mT corresponds to the length of the mark or space, the length of the mark and the length of the space may be expressed by mT in this specification.

In the optical disk 1, a shift in mark edge by heat interference is hard to occur if a long mark and space of 6T or greater is continuously formed, and for the set of a long mark and space of 6T or greater, an optimum recording parameter common in each set is already set. Specifically, in this example, recording is performed with an optimum recording parameter for a mark leading edge in the 6T space and 8T mark, or mark trailing edge in the 8T mark and 6T space.

When a periodic NRZI (non-return to zero inverted) signal (recording pattern) shown in FIG. 2(*a*) is given from the pattern generation circuit 8, and a predetermined recording parameter is given from an optical disk controller 12, then the record compensation circuit 9 generates, for example, a laser driving signal (recording pulse signal) as shown in FIG. 2(*b*). Here, the Tsfp shown in FIG. 2(*b*) is a recording parameter determining a position of an edge ahead of a mark (hereinafter referred to as leading edge), and the Telp is a recording parameter determining a position of a mark trailing edge. A recording pulse signal is generated based on such recording parameters.

By irradiating the optical disk 1 with a laser beam according to the recording pulse signal generated in this way, a mark is physically formed on the optical disk 1 as shown in FIG. 2(*c*). In the optical disk 1 using a phase change medium layer as a recording layer, this mark is formed as an amorphous area in a recording layer.

Here, consider the case where the value of Telp as a recording parameter determining the position of the trailing edge of the 4T mark is changed to Telp 1, Telp 2 and Telp 3, respectively. Furthermore, Telp 1, Telp2 and Telp 3 each correspond a width of last pulse of multi pulses for writing a 4T mark, and meet the relation of Telp 1<Telp 2<Telp 3. In addition, Telp 2 is an optimum recording parameter allowing the mark to have a desired shape. In the case where the recording parameter Telp is changed to Telp 1, Telp 2 and Telp 3 in this way, the shape of the 4T mark formed on the optical disk (position of mark trailing edge) is changed as shown in FIG. 2(*c*).

If the recording parameter Telp is set to an optimum value Telp 2, a reproduction signal denoted by the solid line in FIG. 2(*d*-1) is obtained. Furthermore, in FIG. 2(*d*-1), the dashed line denotes a reproduction signal when Telp is set to Telp 1 or Telp 3.

When the reproduction signal denoted by the solid line in FIG. 2(*d*-1) is obtained as described above, and then the threshold Th1 of the comparator 4 is set based on the reproduction signal so that the integral of the binarized output equals 0. Binarization is performed using the threshold Th1 set in this way, whereby a binarized signal is obtained. Furthermore, a phase difference between the binarized signal outputted from the comparator 4 and the reproduction signal is detected in the phase comparator 5, and the reproduction clock signal is feedback-controlled so that the integral of the detected phase difference equals 0. In this way, the reproduction clock signal shown in FIG. 2(*e*-1) is generated.

On the other hand, if the recording parameter Telp is set to Telp 1 being a value smaller than the optimum value Telp 2, the reproduction signal denoted by the solid line in FIG. 2(*d*-2) is obtained. In this case, the edge position of the 4T mark trailing edge is shifted in the direction of the time axis, and therefore the threshold Th2 of the comparator 4 is higher than the level Th1 shown in FIG. 2(*d*-1) as shown in FIG. 2(*d*-2). Consequently, the binarized signal outputted from the comparator 4 is changed. In addition, the reproduction clock signal generated so that the integral of the phase difference between itself and the binarized signal is more advanced in shift than the clock signal shown in FIG. 2(*e*-1) as shown in FIG. 2(*e*-2).

Conversely, if the recording parameter Telp is set to telp3 being a value larger than the optimum value Telp 2, the reproduction signal denoted by the solid line in FIG. 2(*d*-3) is obtained. In this case, the edge position of the 4T mark trailing edge is shifted in the direction of the time axis, and therefore the threshold Th3 of the comparator 4 is lower than the level Th1 shown in FIG. 2(*d*-1) as shown in FIG. 2(*d*-3). Consequently, the binarized signal outputted from the comparator 4 is changed. In addition, the reproduction clock signal generated so that the integral of the phase difference between itself and the binarized signal is less advanced in shift than the clock signal shown in FIG. 2(*e*-1) as shown in FIG. 2(*e*-3).

Here, when a shift in time or phase difference (so called inter-data clock jitter) between the reproduction signal (here binarized signal outputted from comparator) and the reproduction clock signal in the mark trailing edge (rise edge of reproduced binarized signal) is measured, distributions shown in FIGS. 3(*f*1) to 3(*f*3) are obtained when the recording parameter Telp is set to Telp 1 to Telp 3, respectively. Furthermore, a curve showing a distribution of the phase difference related to the 4T mark trailing edge and a curve showing a distribution of the phase difference related to the 8T mark trailing edge are shown in each of FIGS. 3(*f*1) to 3(*f*3). In addition, the variation in the 4T mark trailing edge and the variation in the 8T mark trailing edge are assumed to have normal distributions of the same distributed values.

FIG. 3(*f*-2) shows the recording parameter Telp being set to an appropriate value Telp 2. In this case, the distribution of the phase difference between the rise edge of the reproduction signal representing the 4T mark trailing edge and the reproduction clock is a normal distribution with 0 at a center, and the average value of this phase difference equals 0. Also, the distribution of the phase difference between the rise edge of the reproduction signal representing the 8T mark trailing edge and the reproduction clock is a normal distribution with 0 at a center, and the average value of this phase difference equals 0. That is, the both distribution curves are formed in such a manner that one is superimposed on another. In this way, if the recording parameter specifying the position of the trailing edge of the 4T mark is appropriate, the total jitter of the reproduction signal is minimized.

However, if the recording parameter Telp is Telp1 (value smaller than the optimum value Telp 2), the phase of the reproduction clock signal is shifted compared to the phase shown in FIG. 2(*e*-1) as shown in FIG. 2(*e*-2), and therefore neither the average value of the phase difference related to the 4T mark trailing edge nor the average value of the phase difference related to the 8T mark trailing edge equals 0 as shown in FIG. 3(*f*-1). Each of the distributions of these phase differences is not overlapped on another, and is a normal distribution having a center at the same distance from 0. That is, the phase of the reproduction clock is changed due to the shift in the 4T mark trailing edge, and therefore the average of the phase difference (peak of distribution curve) in either the signal matching the 4T mark or the signal matching the 8T mark recorded with an essentially appropriate recording parameter no longer equals 0. As a result, compared to the case of FIG. 3(*f*-2), the degree of deviation of the reproduction signal from the clock signal increases as a whole, and thus the jitter of the reproduction signal is increased.

Similarly, if the recording parameter Telp is Telp 3 (value larger than the optimum vale Telp 2), neither the average value of the phase difference related to the 4T mark trailing edge nor the average value of the phase difference related to the 8T mark trailing edge equals 0 as shown in FIG. 3(*f*-3). Each of the distributions of these phase differences is not superimposed on another, and is a normal distribution having a center at the same distance from 0. Furthermore, two distribution curves shown in FIG. 3(*f*-3) and two distribution curves shown in FIG. 3(*f*-1) are different in that the distribution for the 4T mark trailing edge and the distribution for the 8T mark trailing edge change their places. In this case, the spread of deviation of the reproduction signal from the clock signal increases compared to FIG. 3(*f*-2), and thus the overall jitter of the reproduction signal is increased.

For inhibiting the increase in jitter, the optical disk drive 900 shown in FIG. 1 accumulates the absolute value of the phase difference between the reproduction signal and the clock signal to determine a value having a correlation with the jitter, and selects a recording parameter so that the value is minimized. FIG. 3(*g*) is a graph showing a relation between the set recording parameter Telp and the jitter amount outputted from the difference detection circuit 11 (i.e. cumulative absolute value of phase difference). As apparent from this graph, the jitter amount outputted from the difference detection circuit 11 is minimized when the recording parameter Telp is Telp 2. The optical disk drive 900 changes the recording parameter Telp to write predetermined data for finding out such an optimum recording parameter Telp 2.

Although the procedure for optimizing the recording parameter Telp for the 4T mark trailing edge has been described in the above example, a recording pattern same as that described above (i.e. repeated pattern of 6T space, 4T mark, 6T space and 8T mark) can be used to determine an optimum value for a recording parameter Tsfp specifying a 4T mark leading edge, as well.

Furthermore, for marks of lengths other than those described above, an optimum recording parameter is determined using a similar procedure. In this case, however, test recording is carried out using a specific recording pattern matching each set of mark lengths and space lengths. For example, using a recording pattern formed by repetition of a 6T space, a 3T mark, a 6T space and a 9T mark, a recording parameter related to the 3T mark trailing edge in the set of the 3T mark and 6T space, and a recording parameter related to the 3T mark leading edge in the set of the 6T space and 3T mark are optimized.

The recording parameter set for each set of a mark length and a space length will be more specifically described below.

In the optical disk device, the polarity inversion period of a recording signal is limited to a predetermined period according to a code demodulating system or the like. That is, the lengths of marks and spaces formed on the recording medium are limited to within a predetermined range. For example, if 8/16 modulation is employed as a code modulating system, data to be recorded is represented by a recording pattern having an inversion period of 3T to 11T that is an integral multiple of a clock period T, and an SYNC code recorded for detection of synchronization is represented by a recording pattern having an inversion period of 14T. Based on this recording pattern, a mark or space having a length corresponding to the inversion period of 3T to 11T or 14T is formed on the recording medium. In this specification, this is expressed such that a mark or space having a length of 3T to 11T or 14T is formed.

Here, the minimum polarity inversion interval of a recording data signal is mT, and the maximum polarity inversion interval is nT (m and n are each an integer of 1 or greater). In this case, the lengths of a formed mark and space are expressed by mT to nT. Furthermore, the value of m (or n) may be different for the mark and the space, but the same value is adopted for both cases here.

In this case, the position of the leading edge of a mark formed on the recording medium can be changed depending on the length of the space just before the mark and the length of the mark itself. Therefore, the recording parameter Tsfp specifying the position of the leading edge is set for each set of the length mT to nT of the space just before the mark and the length mT to nT of the mark itself. In addition, the recording parameter Telp related to the mark terminal position is set for each set of the length mT to nT of the mark itself and the length mT to nT of the space just after the mark.

As described above, however, an edge shift of a mark is hard to occur in a set of a relatively long mark and a relatively long space. Thus, it is not necessary to specify a recording parameter for each set for a set of a mark and a space each having a predetermined length or greater. The predetermined length of the mark is (m+a)T, and the predetermined length of the space is (m+b)T (a and b are each an integer of 0 to n-1). In this case, the position of the leading edge of a mark formed on the recording medium can be changed depending on the set of the width mT~(m+b)T of the space just before the mark and the length mT~(m+a)T of the mark itself. In addition, the position of the trailing edge of a mark formed on the recording medium can be changed depending on the set of the length mT to (m+a)T of the mark itself and the width mT to (m+b)T of the space just after the mark.

Thus, the recording parameter is preferably specified for each set of one of a different mark lengths, one of b different space lengths, and one of the mark leading edge and mark trailing edge (each of a×b×2 sets).

If m=3 and a=b=3 hold, then 32 different recording parameters are specified as shown in Table 1 (recording parameter Tsfp specifying the mark leading edge) and Table 2 (recording parameter Telp specifying the mark trailing edge). This matches the specification of DVD-RAM disk having a recording capacity of 4.7 GB that is now widely used.

TABLE 1

| Tsfp | 3Tm | 4Tm | 5Tm | 6Tm |
|---|---|---|---|---|
| 3Ts | 5 | 4 | 2 | 1 |
| 4Ts | 5 | 4 | 2 | 1 |
| 5Ts | 5 | 4 | 2 | 2 |
| 6Ts | 6 | 4 | 3 | 2 |

TABLE 2

| Telp | 3Tm | 4Tm | 5Tm | 6Tm |
|---|---|---|---|---|
| 3Ts | 9 | 10 | 10 | 11 |
| 4Ts | 9 | 10 | 10 | 11 |
| 5Ts | 9 | 9 | 10 | 10 |
| 6Ts | 8 | 9 | 10 | 10 |

Furthermore, in Tables 1 and 2 described above, the mark of 3T is abbreviated as "3Tm", for example, and the space of 3T is abbreviated as "3Ts", for example. In addition, the values in Tables are illustrative of recording parameters. In this way, the optical disk drive 900 optimizes each of 32 different recording parameters for the mark leading edge and the mark trailing edge specified for each set of a mark length and a space length.

The operation of the optical disk drive 900 in the case of optimizing all recording parameters will be described below with reference to the flowchart of FIG. 4.

First, as shown in step S1, the optical head 1 is moved (jumped) to a test recording area of the recording medium. The optical disk drive 900 carries out test recording in this area to optimize each of a plurality of recording parameters individually specified for each set of a mark length and a space length and depending on the mark leading edge or mark trailing edge.

Then, as shown in step S2, whether a recording parameter that has not optimized yet exists or not is determined, and if such a parameter exists, optimization for the parameter is carried out.

For this optimization, test recording is carried out using a recording pattern associated with the recording parameter. In test recording, recording is performed based on a predetermined recording pattern selected as a recording pattern matching the recording parameter while the value of the recording parameter is changed for each area (e.g. sector) (step S3). Consequently, a mark having a different edge position depending on the value of the recording parameter is formed in each area.

Then, data recorded in the test recording area is reproduced, and the jitter amount outputted from the difference detector 5 is measured for each area in which data is recorded while the value of the recording parameter is changed (step S4). Consequently, the relation between the value of the recording parameter and the jitter is recognized so that the optical disk drive 900 can select as an optimum value the value of a recording parameter allowing the jitter to be minimized (step S5). In this way, the recording parameter is optimized.

Then, in step S2, if there exists a recording parameter to be further optimized, optimization for the recording parameter is carried out in the same manner as described above. By repeating this operation, all recording parameters can be optimized.

In this way, in the conventional correction operation, optimization for the recording parameter is performed by selecting a parameter value allowing the jitter to be minimized from a plurality of parameter values for all recording parameters. In this case, however, test recording with different parameter values should be carried out each time each recording parameter is optimized. This is because the relation between the parameter value and the jitter shown in FIG. 3(g) must be recognized for determining a parameter value allowing the jitter to be minimized, and for this purpose, the jitter should be measured for each case where a plurality of recording parameter values are used. However, in the case where test recording using a plurality of parameter values is carried out for every recording parameter, in this way, a problem arises such that an amount of time required for the correction operation is increased.

In addition, when the jitter is measured as described above, test recording is carried out using different recording parameters according to recording parameters. Each recording pattern should be configured to make it possible to make an evaluation on whether a predetermined recording parameter is appropriate or not from the detected jitter. Accordingly, for the recording pattern, a relatively simple pattern such as a pattern formed by repletion of a 6T space, 4T mark, a 6T space and 8T mark, for example, is used so as not to match a larger number of recording parameters.

However, if such a recording patter is used, the patter of marks and spaces formed on the optical disk becomes poor in randomness. If such a regular pattern is formed, a subsequent test recording operation or the like in which a mark and a space are formed in the same area can easily be influenced by the previously formed pattern. Thus, if a pattern as described above is formed, a primary recording operation should be carried out using a random pattern before recording (overwrite) of new data is performed. This also increases an amount of time required for the test recording operation.

In this way, in the conventional method, a relatively large amount of time is required for optimizing each recording parameter. This correction operation is carried out at the time when the recording medium is attached or detached or the like, but it takes long time, and therefore a considerable amount of time is required until the device puts itself into a standby state.

The present invention has been made for solving the above problems of the conventional technique, and its object is to provide a recording/reproducing device capable of optimizing recording parameters in shorter time.

DISCLOSURE OF THE INVENTION

The device of the present invention is a device for writing data expressed by sets of marks and spaces formed on a recording medium in the recording medium, and/or reading the data from the recording medium. The deice comprises: a writing unit for writing in the recording medium predetermined data matching a recording pattern so specified as to include a plurality of mutually different sets of mark lengths and space lengths; a reading unit for reading the predetermined data from the recording medium to generate a data signal matching the predetermined data; an edge shift detector for measuring the edge shift amount of the mark formed on the recording medium for each set of a mark length and a space length using the data signal; and a record controller for setting a recording parameter for each set of a mark length and a space length based on the measured edge shift amount.

In a preferred embodiment, the device further comprises a clock generator generating a clock signal based on a reproduction signal obtained by reading data recorded on the recording medium, and the edge shift amount is detected as a phase difference between the data signal and the clock signal.

In a preferred embodiment, the clock generator controls the clock signal so that the phase difference between the reproduction signal and the clock signal becomes close to 0 as a whole.

In a preferred embodiment, if a shortest mark length and a shortest space length are each represented by mT (m is a predetermined integer of 1 or greater, and T is a period of a clock signal), the plurality of sets of mark lengths and space lengths are sets of mark lengths of mT to (m+a)T and space lengths of mT to (m+b)T (a and b are each any integer of 0 or greater), the recording pattern is so specified as to include the sets continuously, and the edge shift detector measures separately the edge shift amount in the leading edge of the mark and the edge shift amount in the trailing edge of the mark for each set of a mark length and a space length.

In a preferred embodiment, the recording pattern has unit patterns each so specified as to include predetermined one set of the mark length and the space length to set the recording parameter.

In a preferred embodiment, the edge shift detector accumulates an edge shift amount with a sign for each set of the mark length and the space length.

In a preferred embodiment, the edge shift detector outputs an output value matching the edge shift amount for each set of the mark length and the space length.

In a preferred embodiment, the record control unit determines whether the output value of the edge shift detector is within a predetermined range or not for each set of the mark length and the space length, and changes the recording parameter only for the sets of mark lengths and space lengths for which it is determined that the output value is out of the predetermined range.

In a preferred embodiment, the record control unit determines whether the absolute value of the output value of the edge shift detector is smaller than a predetermined value for each set of a mark length and a space length.

In a preferred embodiment, the output value of the edge shift detector, associated with a predetermined one set of the mark length and the space length, is used as a reference value, and the record control unit determines whether a difference between the output value of the edge shift detector and the reference value is within a predetermined range for each set of the mark length and the space length, and changes the recording parameter only for the sets of mark lengths and space lengths for which it is determined that the difference is out of the predetermined range.

In a preferred embodiment, the record controller determines whether the recording parameter is to be increased or decreased based on the sign of the output value of the edge shift detector.

In a preferred embodiment, the record controller determines an increased or decreased amount based on the magnitude of the output value of the edge shift detector.

In a preferred embodiment, the record controller weights the magnitude of the output value with the increased or decreased amount according to the sets of mark lengths and space lengths when the increased or decreased amount of the recording parameter is determined.

In a preferred embodiment, the device further comprises a binarizing circuit generating a binarized signal by binarizing the data signal, and a specific set of a mark length and a space length in the data signal is identified based on the binarized signal.

Alternatively, the device of the present invention is a device for writing data expressed by sets of marks and spaces formed on a recording medium in the recording medium, and/or reading the data from the recording medium. The device comprises: a writing unit for writing in the recording medium predetermined data matching a predetermined recording pattern so specified as to include a plurality of mutually different sets of mark lengths and space lengths; and an edge shift detector for measuring the edge shift amount of the mark recorded on the recording medium based on the predetermined data read from the recording medium. The predetermined recording pattern is specified so that the plurality of sets of mark lengths and space lengths appear with equal frequency, and the digital sum value equals 0.

In a preferred embodiment, if a shortest mark length and a shortest space length are each represented by mT (m is a predetermined integer of 1 or greater, and T is a period of a clock signal), the predetermined recording patter has unit patterns specified so that a×b×2 sets (a and b are each any integer of 0 or greater) with mark lengths of (m+a)T, space lengths of (m+b)T and polarities determined depending on the leading edge and trailing edge of the mark each appear once.

In a preferred embodiment, the edge shift detector measures the edge shift amount for each the set of a mark length and a space length.

BRIEF DESCRIPTION OF THE DRAWINGS

FIG. 3 is another diagram for explaining an operation for correcting the recording parameter in the conventional technique;

FIG. 9 is a schematic illustration of operations of a pattern detection circuit and an edge shift detection circuit of the recording/reproducing device according to the embodiment of the present invention;

FIG. 14 shows a recording pattern for use in the recording/reproducing device of the present invention;

FIG. 15 shows another recording pattern for use in the recording/reproducing device of the present invention;

BEST MODE FOR CARRYING OUT THE INVENTION

The recording/reproducing device according to the embodiment of the present invention will be described below with reference of the drawings.

Figure 5:
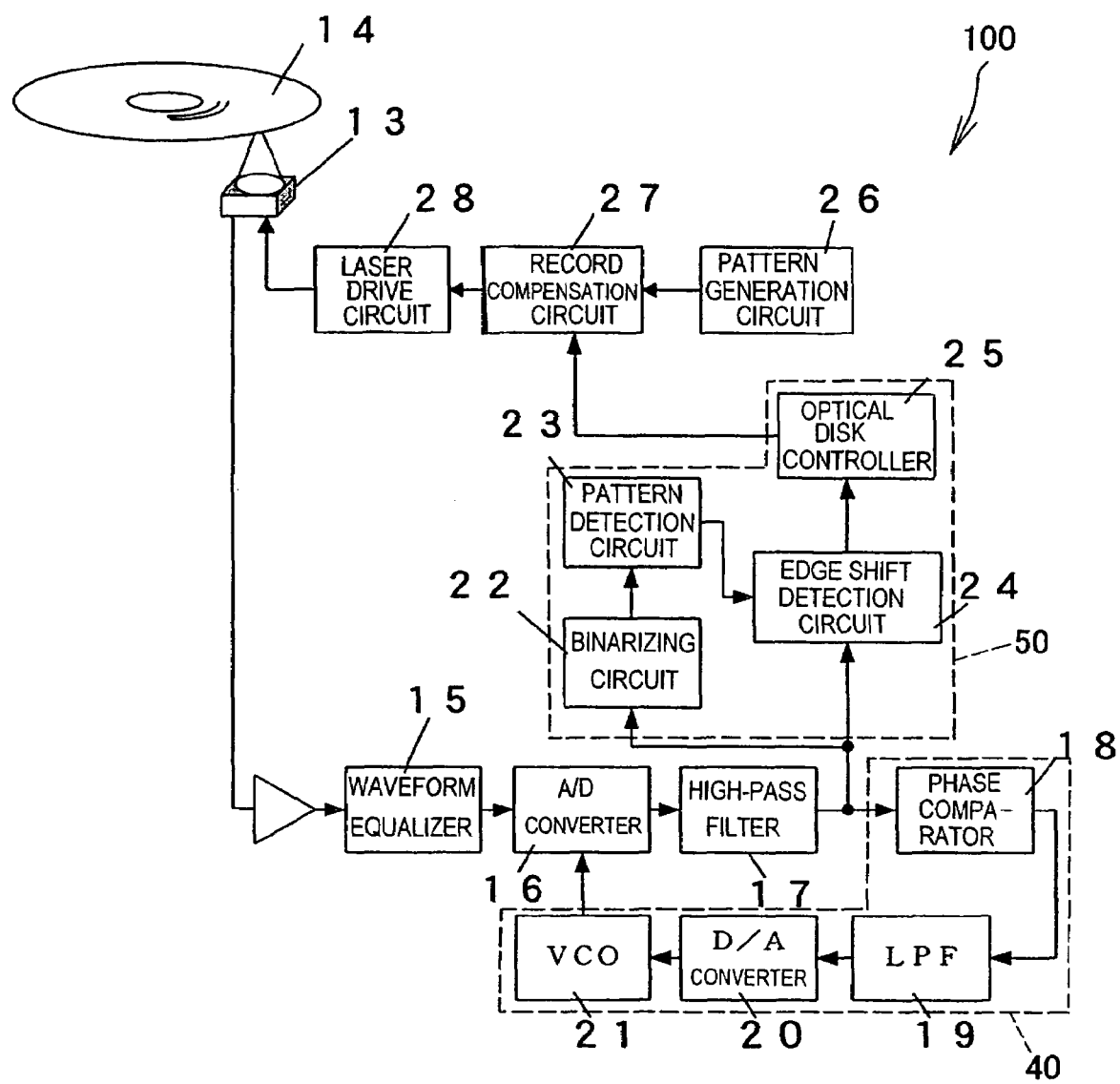
FIG. 5 shows a recording/reproducing device according to the embodiment of the present invention.

FIG. 5 shows an optical disk device 100 of this embodiment. The optical disk device 100 carries out an correction operation (test recording) for optimizing a recording parameter when an optical disk 14 is placed or the like.

In test recording, a recording pulse signal is first generated by a record compensation circuit 27 using a predetermined recording pattern inputted from a pattern generation circuit 26 and an initialized recording parameter. Furthermore, for the recording parameter, a parameter previously recorded on the optical disk 14 may be read and used.

The recording pattern for test recording for use in this embodiment is so specified as to include a plurality of mutually different sets of mark lengths and space lengths, such as 4T mark, 3T space, 4T mark, 4T space, 4T mark and 5T space (hereinafter may be referred to as 4m3s4m4s4m5s). More specifically, the recording pattern is configured to include at least two sets in addition to a set of a mark of 6T or greater and a space of 6T or greater as a base. The above example includes sets of 4m3s, 4m4s, 4m5s and the like. In addition, this recording pattern is configured to make it possible to optimize all recording parameters (e.g. 32 different recording parameters) set for each set of a mark length and a space length as shown in Tables 1 and 2. Furthermore, this recording pattern is configured so that the DSV (digital sum value) equals 0. Furthermore, suitable recording patterns will be described more in detail later.

A laser drive circuit 28 drives an optical head 13 in response to a laser emission control pulse signal, and records predetermined data on the optical disk. The optical disk device 100 employs so called a mark edge recording system, and a plurality of marks and spaces having different lengths matching the predetermined data are formed on the optical disk.

Then, for optimizing each recording parameter, the predetermined data recorded on the optical disk 14 as above is reproduced, and whether the parameter is appropriate or not is determined from the obtained reproduction signal.

For this purpose, the optical disk 14 is irradiated with a laser beam using the optical head 13. Reflected light from the predetermined data recorded on the optical disk 14 is converted into a reproduction signal in the optical head 13. This reproduction signal is amplified and then waveform-shaped by a waveform equalizer 15.

Furthermore, in this embodiment, the optical head 13 may write data on the optical disk 14 and read data recorded on the optical disk 14, but a data writing device and a data reading device may be provided as one united body like the optical head 13 of this embodiment, or they may be provided separately.

The waveform-shaped reproduction signal is sampled and quantized by an analog-digital converter (A/D converter) 16 and consequently, data having multi-levels is outputted as a digital signal from the A/D converter 16. Furthermore, the sampling frequency in the A/D converter 16 is set based on an output (reproduction clock signal) from a VCO (voltage control oscillator) 21 feedback-controlled as described later.

A high-pass filter 17 removes unnecessary low-frequency components that can be contained in a signal outputted from the A/D converter 16. An output from the high-pass filter 1 is inputted to a phase comparator 18 constituting a part of PLL circuit 40, and a recording parameter setting block 50.

The phase comparator 18 detects a phase difference between the reproduction signal and the clock signal (i.e. output from VCO 21) based on the inputted digital signal. The method for detecting a phase difference will be described later. An LPF (low-pass filter) 19 determines a frequency to be followed by the VCO 21 from the detected phase difference. A signal outputted from the LPF 19 is converted into an analog signal by a distal-analog converter (D/A converter) 20. The VCO 21 is controlled by this analog signal to generate a reproduction clock.

In this way, in this embodiment, the PLL circuit 40 is constituted by the phase comparator 18, the LPF 19, the VCO 21 and the like. In the PLL circuit 40, the reproduction clock signal outputted from the VCO 21 is feedback-controlled so that the phase difference between itself and the reproduction signal becomes close to 0 as a whole (i.e. the cumulative value or average value of the phase difference measured in each polarity inversion portion in the reproduction signal becomes close to 0). In this way, a clock signal synchronized with the reproduction signal is generated based on the reproduction signal.

However, even if an overall phase difference between the reproduction signal and the clock signal is inhibited, a phase difference between the reproduction signal and the clock signal may occur in each polarity inversion portion of the reproduction signal. The phase difference results from shift of the edge of a mark from an appropriate position due to an inappropriate recording parameter or the like. Thus, if a phase difference is detected in each polarity inversion portion, the edge shift of each corresponding mark can be detected. In addition, the order and direction of the edge shift of the mark can be indicated by the magnitude of the phase difference and the sign (polarity). Thus, if the phase difference is measured, a value capable of indicating the order and direction in which the position of the edge of a corresponding mark is shifted from the edge position of an ideal mark (hereinafter referred to as edge shift amount) can be obtained.

In this way, in this embodiment, the edge shift amount of a mark is detected as a phase difference between a signal with data on a recording medium reproduced and the clock signal. Furthermore, in this specification, the phase difference refers to a shift on the time axis from the rise edge of the reproduction clock signal (corresponding to timing of sampling in A/D converter 16) in the polarity inversion portion of the reproduction signal.

The recording parameter setting block 50 for optimizing a recording parameter by determining an edge shift amount will now be described.

In the recording parameter setting block 50, the binarizing circuit 22 reproduces binarized data matching a recording pattern by binarizing a digital reproduction signal inputted from the high-pass filter 17. Based on the binarized data obtained in this way, the pattern detection circuit 23 can identify a signal pattern matching a predetermined set of a mark length and a space length.

In addition, the edge shift detection circuit 24 cumulatively adds the phase difference for each predetermined set of a mark length and a space length identified by the pattern detection circuit 23. In this way, the edge shift amount of a mark formed on the recording medium can be measured for each set of a mark length and a space length.

An optical disk controller 25 determines whether the edge shift amount is within a predetermined range or not for each set of a mark length and a space length, and a set of whether the mark edge is a mark leading edge or mark trailing edge (i.e. set matching each of recording parameters). If the edge shift amount is within a predetermined range, the recording parameter is not updated with the determination that the recording parameter associated with the set is appropriate. On the other hand, if the edge shift amount is out of the predetermined range, it is determined that the recording parameter associated with the set needs to be changed. The optical disk controller 25 operates to update only a recording parameter that needs to be changed according to the determination.

The optical disk controller 25 can set a recording parameter for each set of a mark length and a space length based on a measured edge shift amount. The optical disk controller 25 outputs the updated recording parameter to a record compensation circuit 27 as required.

The record compensation circuit 27 generates a recording pulse signal based on the recording parameter obtained from the optical disk controller 25. Using the recording pulse signal generated in this way, test recording is further continued. Thereafter, whether the recording parameter is appropriate or not is determined by an operation similar to that described above and if there exists a parameter to be updated, test recording is further carried out. In this way, all recording parameters are optimized.

As described above, in the optical disk device 100 of this embodiment, test recording is carried out using a predetermined recording pattern so specified as to include a plurality of sets of mark lengths and space lengths instead of using a different recording pattern for each recording parameter. At this time, by detecting an edge shift amount for each set of a mark length and a space length, the direction and order in which the edge of a mark in a certain set is shifted can be detected. In this way, a recording parameter to be corrected among a plurality of recording parameters can be selected. Thus, the amount of required time can be considerably reduced compared the conventional correction operation in which same test recording is repeated for all recording parameters.

The method for detecting a phase difference, the method for detecting an edge shift amount and the like will be described in detail below.

First, a specific configuration of the phase comparator 18 constituting the PLL circuit 40 and its operation will be described with reference to FIGS. 6 and 7. The phase comparator 18 detects a phase difference between a reproduction signal and a reproduction clock signal based on a digital signal (quantized reproduction signal) inputted from the high-pass filter 17.

If a reproduction signal shown in FIG. 7(a) is inputted to the A/D converter 16, for example, sampling is carried out based on a reproduction clock signal shown in FIG. 7(b). Thus, a digital signal (sample data) shown in FIG. 7(c) is inputted from the high-pass filter 17 to the phase comparator 18. Furthermore, here, the PRML (Partial Response Most Likelihood) decoding technique is employed, and the inputted digital signal has ideally any one of five values of "0", "b", "a+b", "−b" and "−a−b".

Figure 6:
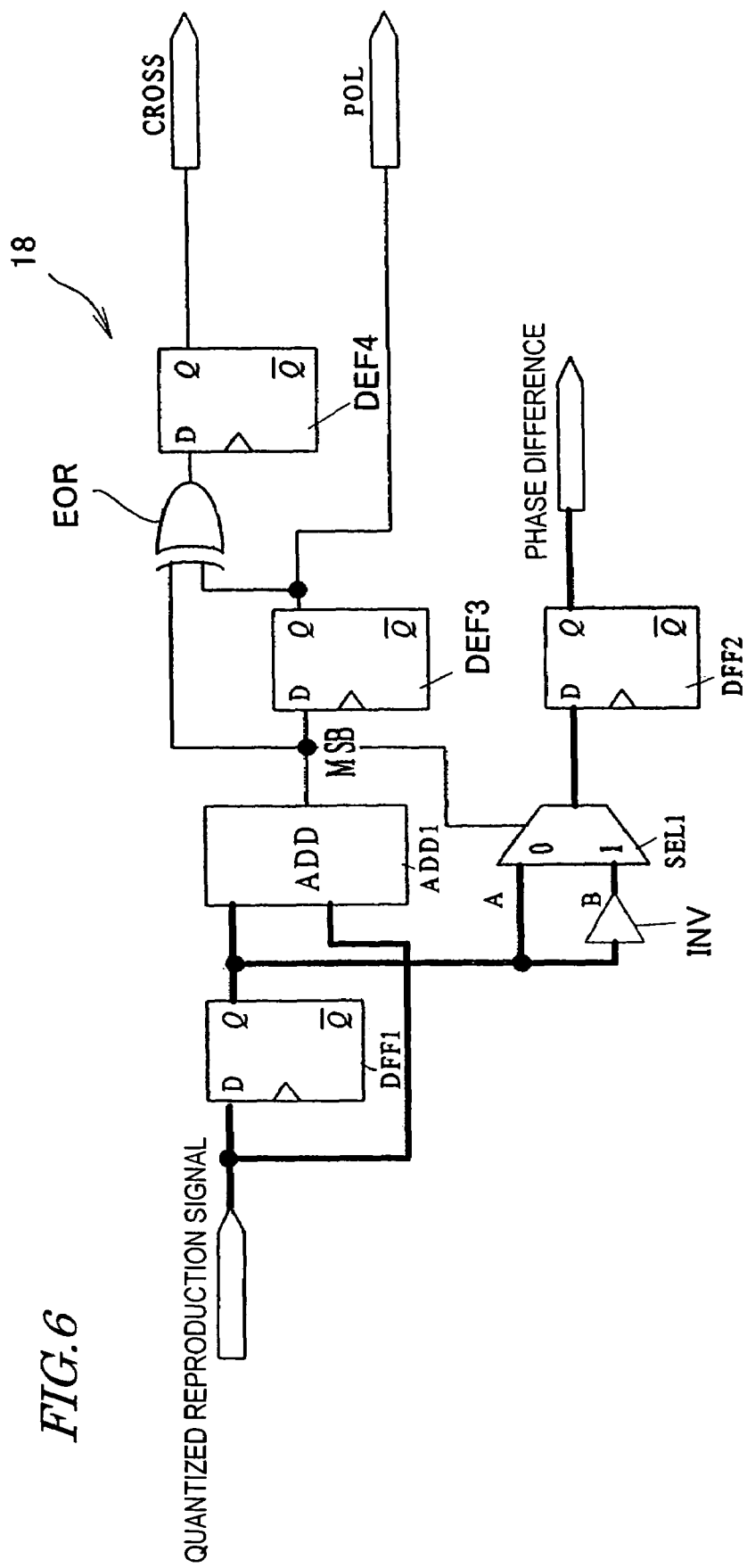
FIG. 6 is a specific circuit block diagram of a phase comparator of the recording/reproducing device according to the embodiment of the present invention.
Figure 7:
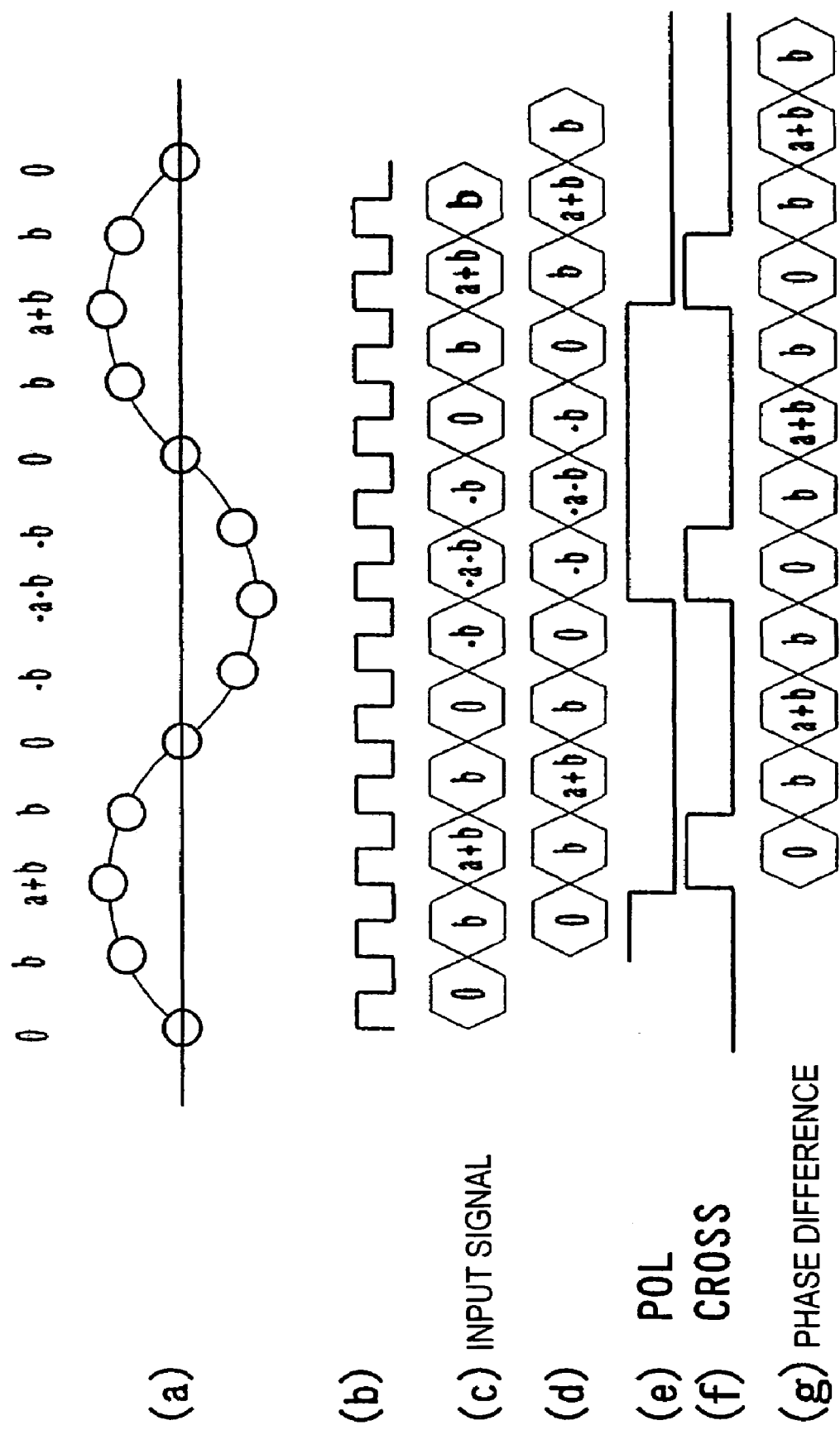
FIG. 7 is a timing chart of the phase comparator of the recording/reproducing device according to the embodiment of the present invention.

FIG. 6 shows a circuit configuration of the phase comparator 18. The phase comparator 18 comprises delayed flip flop circuits DFF1 to DEF4 having an n bit configuration, an adding circuit ADD, a selector SEL1, an exclusive or circuit EOR and the like.

When a signal shown in FIG. 7(c) is inputted to the DFF1, the DFF1 outputs a signal delayed by 1 clock as shown in FIG. 7(d). The delayed signal (FIG. 7(d)) and the non-delayed signal (FIG. 7(c), are inputted to the adding circuit ADD. The adding circuit ADD sums the both signals, and outputs a MSB (most significant bit) in the result of the summation.

By summation in the adding circuit ADD, summation data corresponding to an average value of neighboring sample data can be obtained. The MSB of the summation data indicates whether the average of neighboring sample data is equal to or greater than a reference value ("0" in this example) or smaller than the reference value. Therefore, the MSB of summation data changes when the reproduction signal crosses a reference level (level of 0 in this case).

Polarity information POL indicating the polarity of sample data shown in FIG. 7(e) is obtained based on the outputted MSB. The polarity information POL can represent recorded data. Furthermore, the reason why the polarity information POL is generated using the MSB of summation data is that by using summation data (value corresponding to an average vale of neighboring data), more accurate polarity information POL matching the recorded digital data can be obtained without being influenced by jitter or the like even sample data that should have ideally a value of 0 actually has a slightly different value such as −1 or 1 due to an influence by jitter or the like.

A change in MSB of the summation result by the adding circuit ADD means that the reproduction signal crosses the level of 0. For detecting a point at which the level of 0 is crossed in the reproduction signal (zero-cross point), an exclusive OR of the MSB and a bit with the MSB delayed by 1 clock with the flip flop DEF 3 is taken in the exclusive or circuit EOR. Consequently, a zero-cross point detecting signal CROSS shown in FIG. 7(f) is outputted from the exclusive or circuit EOR. This zero-cross point detecting signal CROSS is outputted to a gate of the LPF 19 shown in FIG. 5.

The method for detecting a phase difference will now be described. N-bit sample data A outputted from the n-bit parallel flip flop circuit DFF1 and sample data B with the sample data A inversed by an inversion circuit Inv are inputted to a selector SEL provided for detecting a phase difference. The selector SEL makes a selection between sample data A and sample data B based on the value of the MSB using as a select signal the MSB being an output of the adding circuit ADD. As a result, a phase difference shown in FIG. 7(g) is outputted from the selector SEL. However, to the LPF 19, the phase difference is outputted via an n-bit parallel flip flop circuit DFF2 provided as a delay element for adjustment of timing.

If there exists a phase difference between the reproduction signal and the clock signal, sample data corresponding to the zero-cross point has a vale other than "0" depending on the magnitude of the phase difference. This is because the sample data is data sampled based on the clock signal. For determining an overall phase difference between the reproduction signal and the clock signal, however, sample data in the zero-cross point should be formalized in polarity using the inversion circuit as described above. For example, if the clock signal is slightly more advanced than the reproduction signal, sample data when the zero-cross point detecting signal CROSS is high has a negative value and a positive value in repetition during rise and fall of the reproduction signal. In contrast to this, a phase difference generated using the inversion circuit INV has always a negative value. That is, if the inversion circuit INV is used, the polarity of the phase difference appropriately indicates whether the reproduction signal is delayed or advanced in all sample data at the zero-cross point.

The LPF 19 integrates or averages output signals from the flip flop circuit DFF 2 when the zero-cross point detecting signal CROSS is high (i.e. data in zero-cross point). The output from the LPF 19 is inputted to the VCO 21 via the D/A converter 20. The VCO 21 controls the phase or frequency of the output signal (reproduction clock signal) based on an output from the LPF 19 so that the output from the LPF 19 becomes close to 0. In this way, in the PLL circuit 40, the phase of the clock signal is controlled so that the total of phase differences at the zero-cross points of reproduction signals is minimized (the average of phase differences at the points becomes close to 0).

Figure 8:
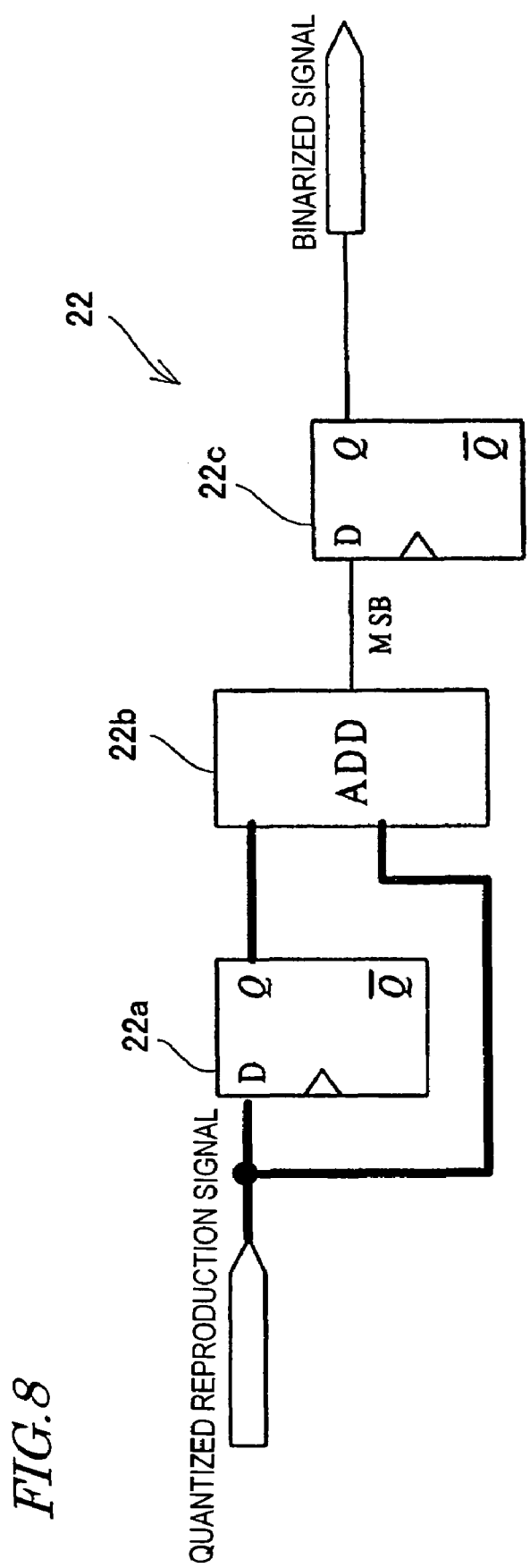
FIG. 8 is a block diagram of a binarizing circuit of the recording/reproducing device according to the embodiment of the present invention.
Figure 11:
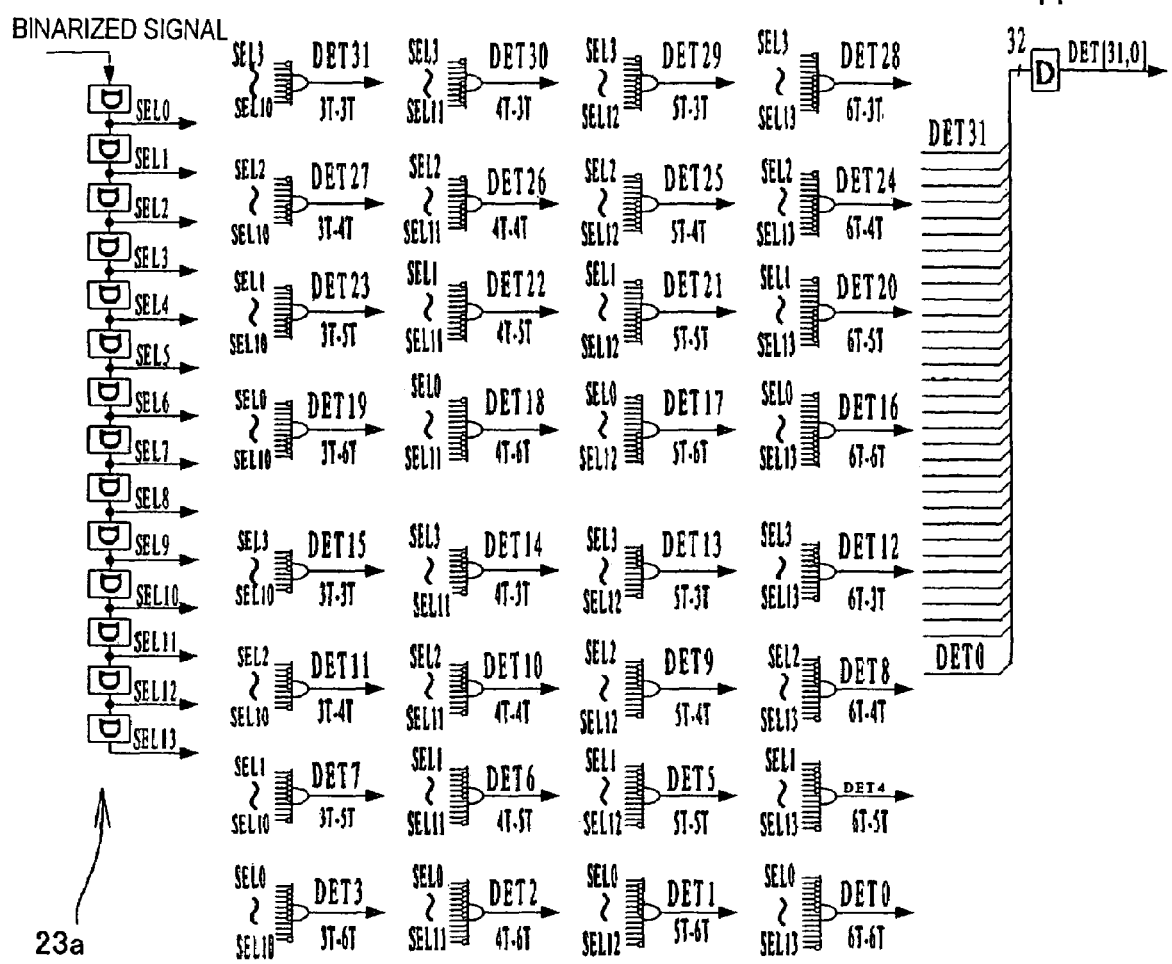
FIG. 11 is a detailed block diagram of the pattern detection circuit of the recording/reproducing device according to the embodiment of the present invention.

The recording parameter setting block 50 will be described more in detail below with reference to FIGS. 8 and 11.

First, the binarizing circuit 22 will be described. As shown in FIG. 8, an n-bit digital reproduction signal is inputted to the binarizing circuit 22 from the high-pass filter 17 as in the case of the phase comparator 18. An adder 22b of the binarizing circuit 22 adds this digital signal to a digital reproduction signal delayed by 1 clock via the n bit parallel flip flop circuit 22a, and outputs the MSB of the sum to the pattern detection circuit 23 as a binarization result. However, it is outputted via a flip flop circuit 22c for adjustment of timing. Furthermore, the operation for generating a binarized signal matching data recorded in this way is same as the operation for obtaining polarity information POL in the phase comparator 18. Thus, the binarizing circuit 22 may be provided as a circuit having a configuration for obtaining polarity information in the phase comparator 18.

Operations of the pattern detection circuit 23 and the edge shift detection circuit 24 will now be described with reference to FIG. 9.

Assume that as shown in FIG. 9(a), a quantized reproduction signal is obtained by reproduction signals and reproduction clocks shown in the figure when the edge shift amount of the trailing edge of a 4T mark followed by a 6T space (trailing edge in a set of a 4T mark and a 6T space) is detected.

Figure 10:
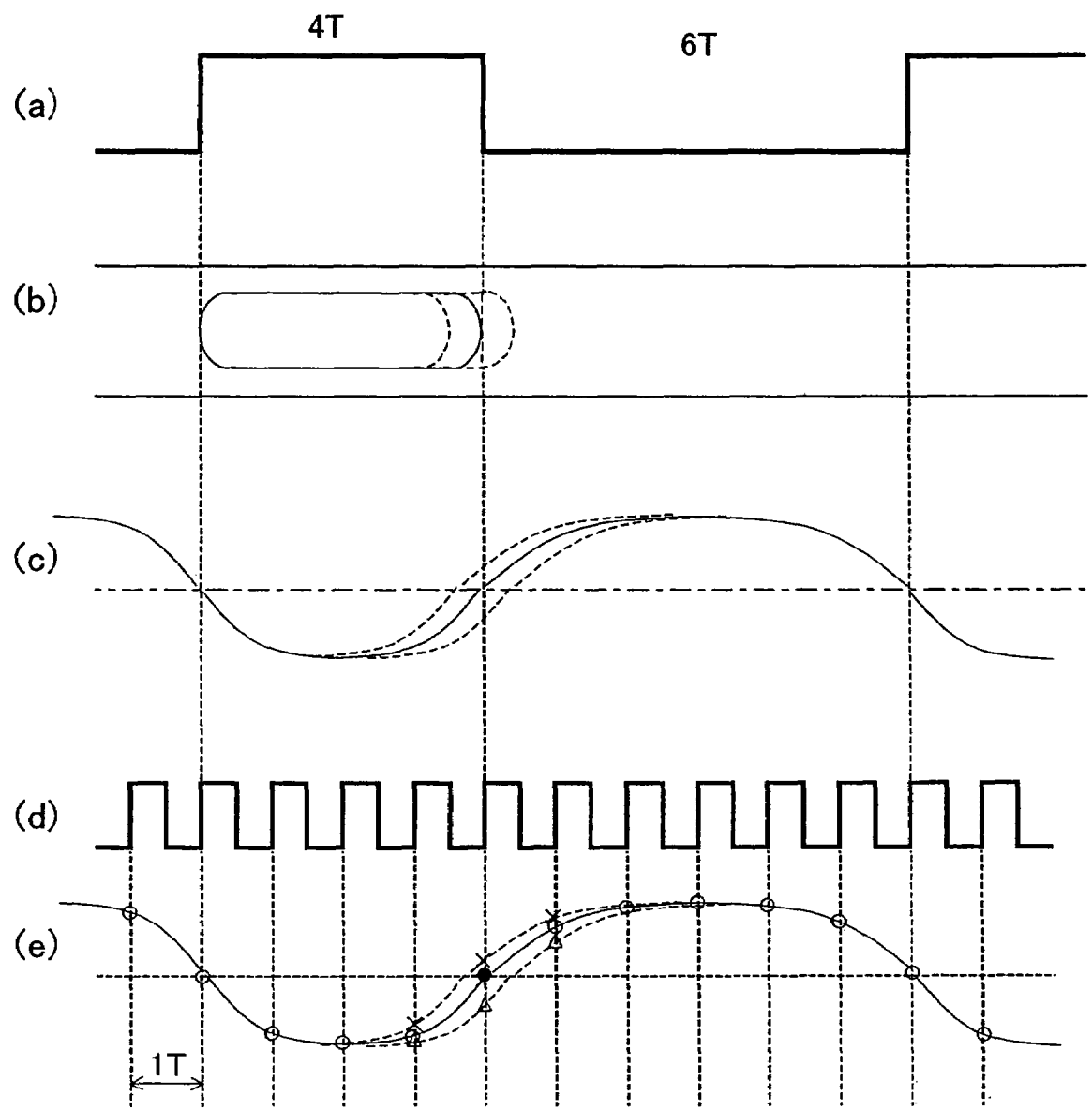
FIG. 10 is a diagram for illustrating how an edge shift amount is detected as a phase difference in the recording/reproducing device according to the embodiment of the present invention.

The pattern detection circuit 23 identifies data at the A point surrounded by an ellipse as data matching the trailing edge in the set of a 4T mark and a 6T space (edge of rise in reproduction signal). The data at the A point is data at the zero-cross point, which corresponds to a phase difference between the reproduction signal and the reproduction clock signal. That is, the value of this data indicates the edge shift -amount of the mark. In addition, the value of this data has a sign (polarity), and this sign can indicate the direction of the edge shift. This aspect will be described more in detail below with reference to FIG. 10.

When test recording is carried out using a recording pattern including a set of a 4T mark and 6T space as shown in FIG. 10(a), the edge of a mark formed on an optical disk may be shifted from an ideal position denoted by the solid line to a position before or after the ideal position as shown in FIG. 10(b). At this time, the waveform of the obtained reproduction signal is also deviated from an ideal waveform denoted by the solid line to a waveform denoted by the dashed line as shown in FIG. 10(c). The degree and direction of deviation in the reproduction signal match the degree and direction of the edge shift of the mark.

Here, when the reproduction signal is sampled using a clock signal shown in FIG. 10(d), the sample value at a zero-cross point ideally equals 0 as shown with ● in FIG. 10(e). In contrast to this, if a mark edge shift occurs, the sample value at the zero-cross point equals a value other than 0 having a magnitude and a polarity matching the shift amount and shift direction of the edge as shown in Δ or x. That is, the shift amount and shift direction of the mark edge are reflected in the magnitude and sign (polarity) of the sample value at the zero-cross point. Thus, by detecting a sample value at the zero-cross point, an edge shift amount can be measured.

Now see FIG. 9 again. Data at the A point ('0' in the figure) is inputted to an adding circuit and a counter circuit provided in correspondence with the set of a 4T mark and a 6T space in the edge shift detection circuit 24. Furthermore, the adding circuit and the counter circuit are provided for each set of a mark length, a space length and one of the trailing edge and the leading edge. In this way, the edge shift detection circuit 24 inputs the value of data at the zero-cross point to a corresponding adding circuit for each set based on the output from the pattern detection circuit 23.

Data inputted in the adding circuit is added to a current cumulative result stored in the flip flop. In addition, the counter circuit counts the number of detections of the pattern (set of a mark length and a space length) detected by the pattern detection circuit. As described later, an edge shift amount for each set described above can be determined by dividing the cumulative value by the count number or the like, and the edge shift detection circuit 24 outputs an edge shift amount for each set to an optical disk controller 25.

In this embodiment, since the VCO 21 is controlled so that the average value of the phase difference equals 0, summation of quantized data at all zero-cross points in the reproduction signal results in 0. However, if the recording parameter is not optimum, the phase difference may have a different value depending on the degree of shift in the edge for each set of a mark length and a space length (i.e. predetermined pattern appearing in the reproduction signal). If the result of the summation described above equals a value other than 0, the degree of the edge shift of the recording mark is known from the magnitude of the value, and the direction in time in which the edge of the recording mark is shifted is known from the sign of the value. Taking the set of a 4T mark and a 6T space described above as an example, the set is formed so that the terminal position of the 4T mark is shorter than an optimum position when the result of summation is a positive value, and the terminal position is longer than the optimum value when the result of summation is a negative value.

In this way, an edge shift amount can be detected for each specific pattern (set of a mark length and a space length) included in a recording pattern. Furthermore, if the number of detections is different for each pattern, an average edge shift amount for the pattern can be determined by dividing the result of summation by the count number. This average edge shift amount makes it possible to determine which of the recording parameters should be changed.

However, the edge shift amount detected as described above is an amount detected as a phase difference between the reproduction signal and the reproduction clock signal feedback-controlled as described above, which does not necessarily fully match the edge shift of a mark formed on an optical disk in practice. For example, even for a pattern with an appropriate recording parameter used so that the pattern has actually no edge shift in the mark, a phase difference may be detected if the phase of the clock signal is changed due to edge shift in other patterns.

However, since the clock signal is controlled so that a phase difference in the overall reproduction signal equals 0, the phase difference detected in each pattern can be considered to indicate an edge shift amount of the mark relative to the average value of the edge shift amount in the overall recording pattern. By detecting this relative edge shift amount, a pattern having an especially high degree of edge shift can be identified. Also, by detecting a phase difference with a sign, the magnitude and the direction of the edge shift in the pattern can be estimated. In this way, a recording parameter that should be changed can be selected, thus making it possible to reduce the amount of time required for the correction operation and also select an appropriate value as a recording parameter.

The optical disk controller 25 corrects a recording parameter for which it is determined that a correction should be made based on the output of the edge shift detection circuit 24. Furthermore, test recording is repeatedly carried out until it is determined that all recording parameters are appropriate. Whether the recording parameter is appropriate or not can be determined based on whether |SUM/C| is smaller than A (A is an arbitrary value) (i.e. whether the edge shift amount is within a predetermined range or not) provided that the result of summation of phase differences is SUM, and the count number is C. If the edge shift amount is out of the predetermined range, a corresponding recording parameter is changed based on the magnitude and the sign of the edge shift amount.

Specific configurations of the pattern detection circuit 23 and the edge shift detection circuit 24 will be described below with reference to FIGS. 11 and 12. As shown in FIG. 11, the pattern detection circuit 23 comprises a plurality of shift registers 23a according to patterns to be detected. Here, 14 shift registers 23a are provided for detecting sets of marks of 3T to 6T and spaces of 3T to 6T. The binarized signal inputted from the binarizing circuit 22 to the pattern detection circuit 23 is inputted to each of 14 shift registers 23a. Outputs from the shift registers 23a are SEL0, SEL1, . . . , SEL13, respectively.

For example, for detection of a rise edge of a set of a 6T mark and a 6T space, a logic circuit may be used such that '1' is outputted with the assumption that the set of a 6T mark and a 6T space is detected when SEL0 is '1' and SEL1 is '0' and SEL2 is '0' and SEL3 is '0' and SEL4 is '0' and SEL5 is '0' and SEL 6 is '0' and SEL7 is '1' and SEL 8 is '1' and SEL9 is '1' and SEL10 is '1' and SEL11 is '1' and SEL12 is '1' and SEL13 is '0', and '0' is outputted in other cases. Similar logic circuits can be used to detect the edge for other patterns. In the circuit configuration shown in FIG. 11, all possible sets (32 different sets) of marks of 3T to 6T and spaces of 3T to 6T (including rise and fall) can be detected. The detection result is inputted to the flip flop circuit FF, then synchronized, and outputted to the edge shift detection circuit 24.

Figure 12:
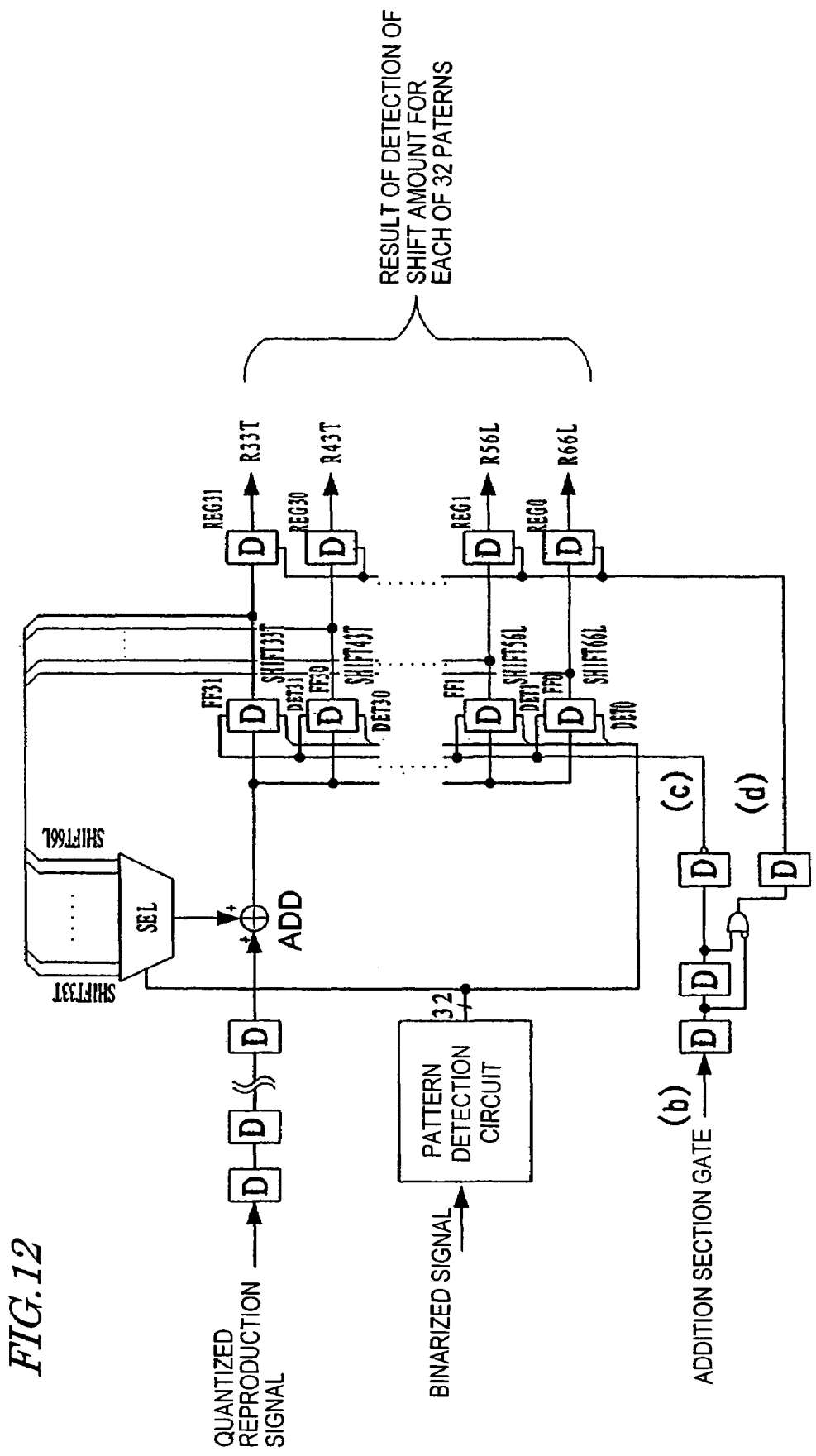
FIG. 12 is a detailed block diagram of the edge shift detection circuit of the recording/reproducing device according to the embodiment of the present invention.

As shown in FIG. 12, an output (pattern detection result) from the pattern detection circuit 23 and a quantized reproduction signal are inputted to the edge shift detection circuit 24. Quantized data at a zero-cross point matching the pattern detection result is inputted to the adder ADD provided in the edge shift detection circuit 24. In addition, the pattern detection result is inputted the selector SEL. Furthermore, by appropriately adjusting input timing of the pattern detection result and input timing of the quantized reproduction signal using the flip flop circuit or the like as a delay element, data at the zero-cross point in the detected pattern can be inputted to the adder ADD. The selector SEL selects a current cumulative result of summation matching the pattern according to the pattern detection result, and inputs the same to the adder ADD. The adder ADD sums the cumulative result and the newly inputted quantized data, and outputs the sum. In addition, an enable signal is outputted to a specific register from the pattern detection result, and the above result of summation is stored on the register.

Figure 13:
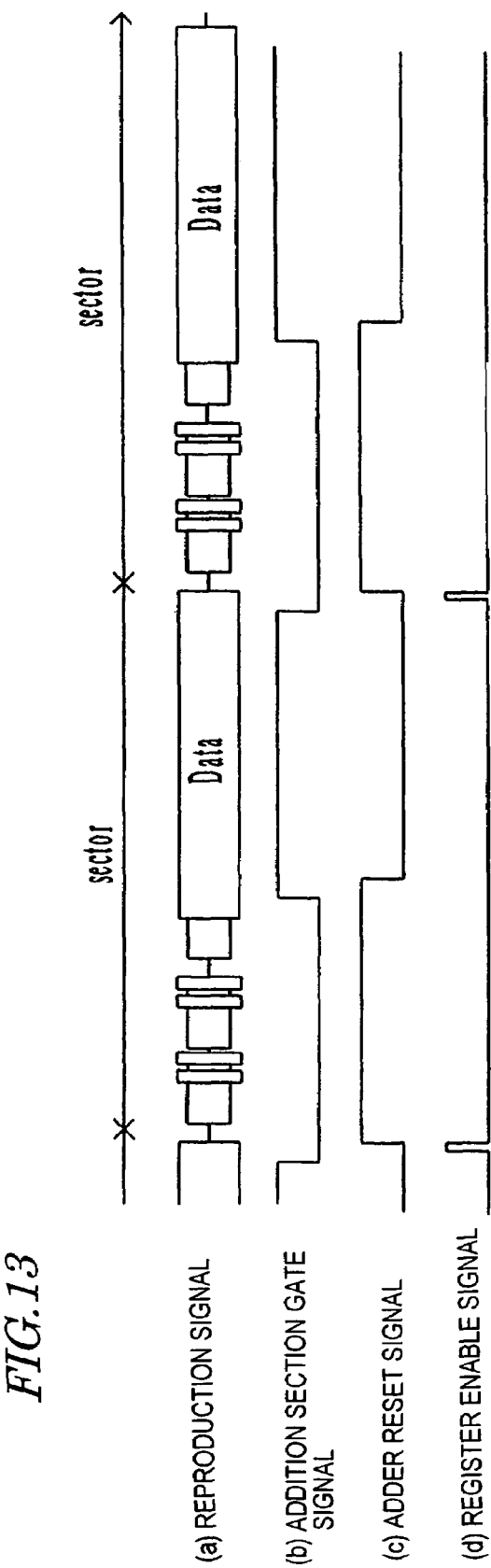
FIG. 13 shows signals specifying the operation of the edge shift detection circuit of the recording/reproducing device of the embodiment of the present invention.

However, there may be cases where the above summation operation should be controlled depending on the data recording format. For example, in the case of a recording medium having a sector structure, a reproduction signal shown in FIG. 13(*a*) is obtained. The recording medium has an emboss area including address information and a data area capable of being rewritten for each sector, and accordingly the reproduction signal has signal portions corresponding to these areas. When test recording is carried out in a user area to determine an edge shift amount in such a case, control for determining addition sections is required. This control will be specifically described. When an addition section gate signal shown in FIG. 13(*b*) is inputted, this signal (b) passes through a three-stage flip flop to be converted into a signal (c) having inverted polarity, and is then inputted to flip flops FF31 to FF0. At this time, using an adder reset signal shown in FIG. 13(*c*), the flip flop is reset in the section of "High", and the result of summation is stored in the section of Low, In addition, a register enable signal shown in FIG. 13(*d*) is generated from the addition section gate. As shown in FIG. 12, this signal (d) functions as an enable signal for storing the result of summation in registers REG31 to REG0 at the trailing edge of the addition section gate. In this way, an edge shift amount is stored in registers REG31 to REG0 for each sector. By employing this circuit configuration, all edge shift amounts required for optimization of recording parameters can be determined using one adder.

Recording patterns that are suitably used in the test recording operation will be described below.

The recording pattern for use in this embodiment is configured to include a plurality of sets of marks and spaces of predetermined lengths (more specifically, at least two sets in addition to a set of a mark of 6T or greater and a space of 6T or greater as a base), and is preferably configured so that these sets appear with equal frequency in the recording pattern. If the recording pattern is configured so that the sets appear with equal frequency in this way, sets of large edge shifts can be selected without necessity to divide the result of summation of phase differences by the count number using a counter circuit as described above.

Figure 1:
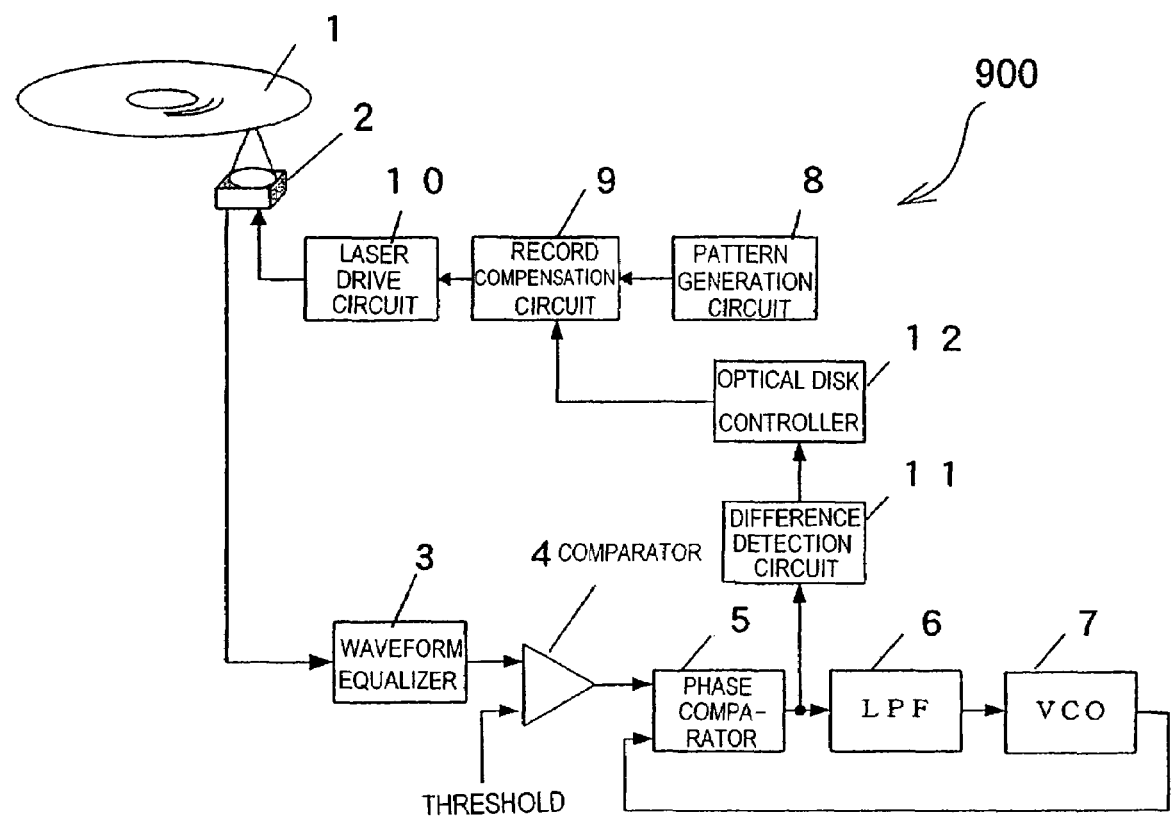
FIG. 1 is a block diagram of a conventional optical disk drive.
Figure 2:
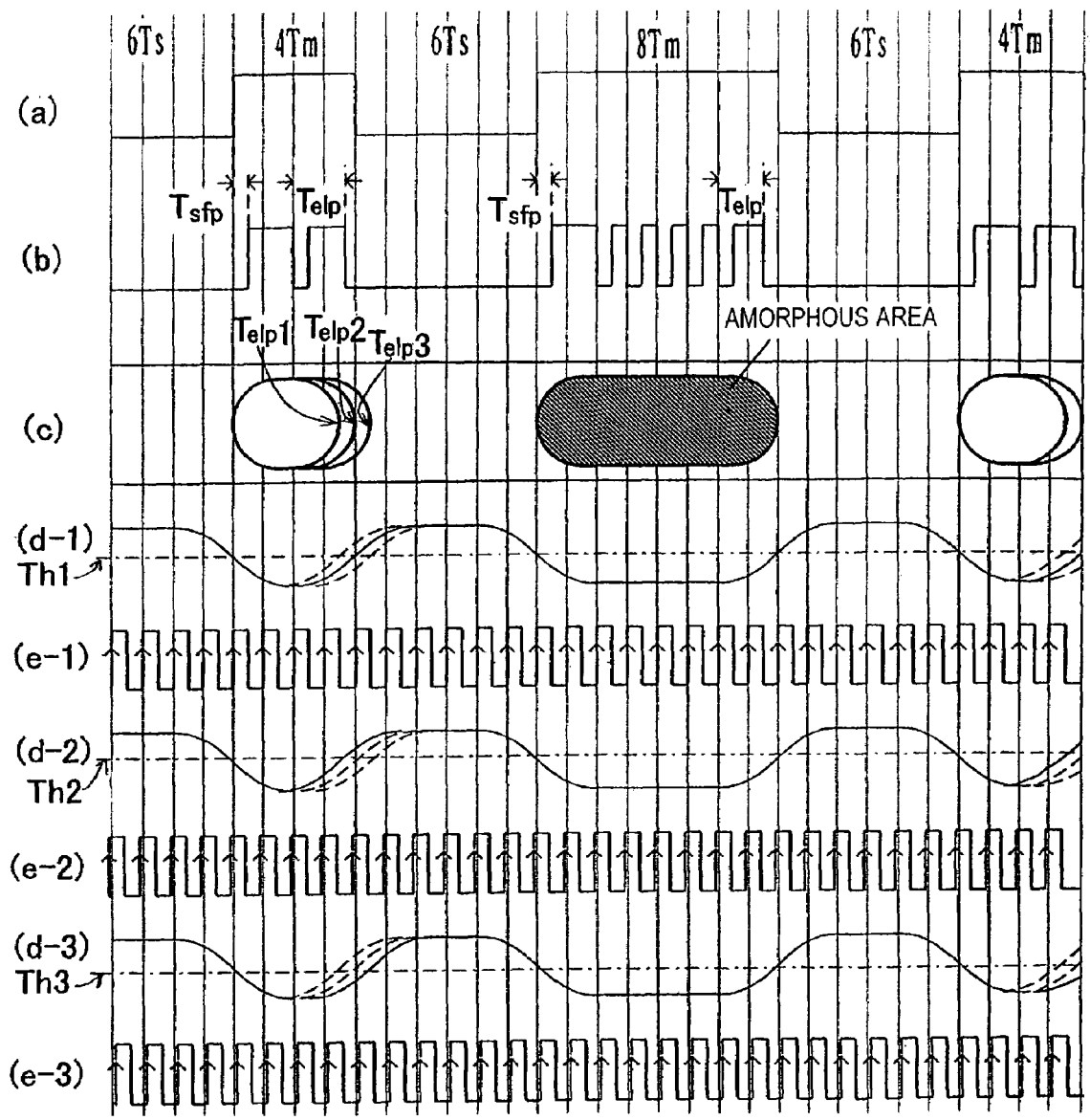
FIG. 2 is a diagram for explaining an operation for correcting a recording parameter in the conventional technique.
Figure 4:
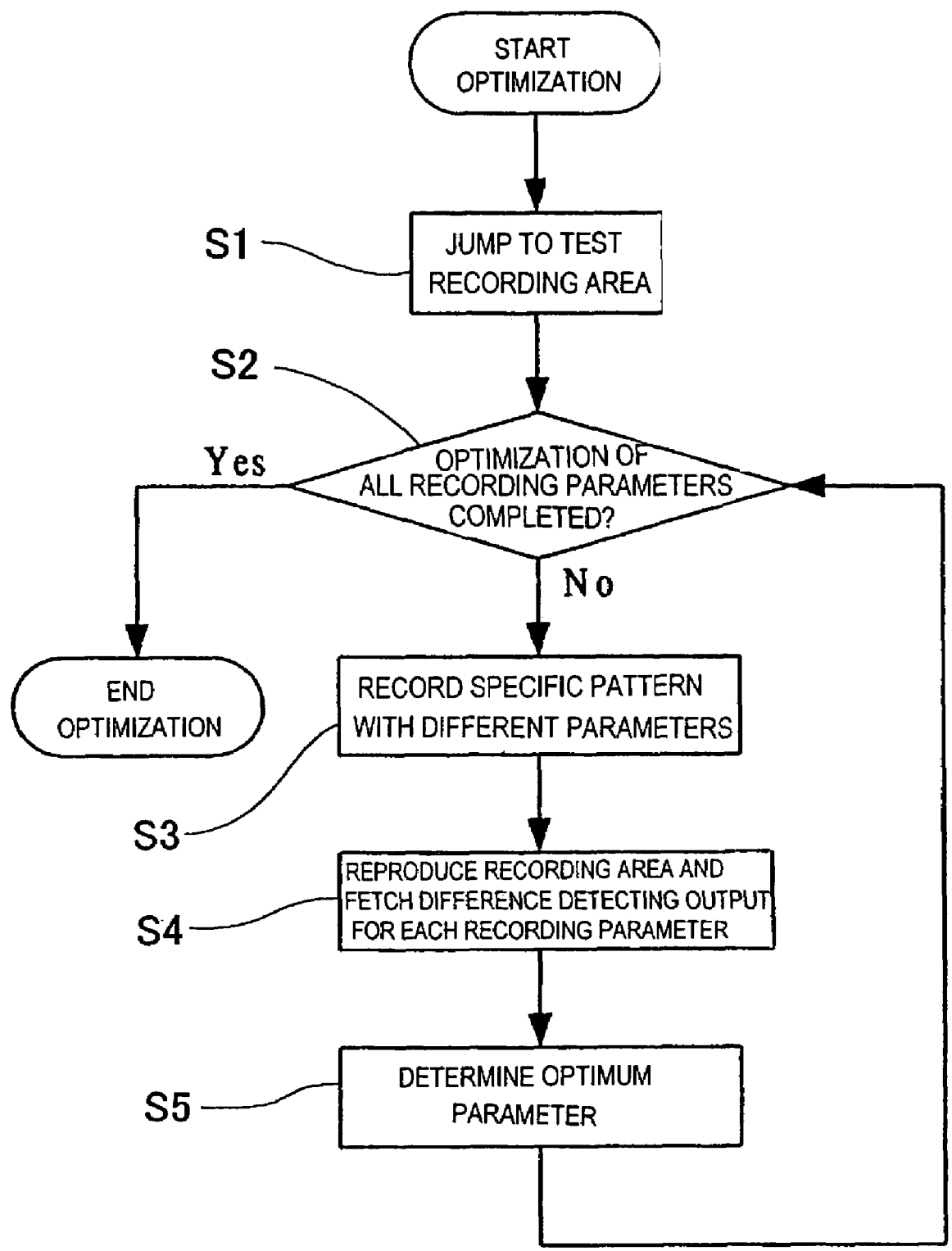
FIG. 4, is a flowchart of an operation for determining the recording parameter in the conventional technique.

In addition, the recording pattern is desirably configured so that its DC component equals 0 (i.e. DSV (digital sum value) equals 0). This is because as long as a recording pattern with the DSV equal to 0 as described above is used, undesired DC components (low frequency components) that may be obtained in the reproduction signal can be appropriately removed by carrying out signal processing resulting in the sum of sample values being equal to 0 in the high-pass filter 17. If DC components of the reproduction signal are removed in this way, an appropriate binarized signal can be obtained in the binarizing circuit 22 in the subsequent stage or the like. Furthermore, even when the reproduction signal is binarized using a comparator or the like unlike this embodiment (see FIG. 1), an appropriate binarized output can be obtained by feedback-controlling a threshold of the comparator so that the integral of the output (binarized output) from the comparator equals 0, as long as a recording pattern with the DSV equal to 0 is used.

Furthermore, it is desirable that a recording pattern is employed such that the sets appear with a highest possible frequency per unit length. If such a recording pattern is used, the edge shift amount in each set can be detected in short time, thus making it possible to reduce the amount of time required for optimization of the recording parameter.

Examples of such recording patterns are shown in FIG. 14. Five recording patterns are illustrated in FIG. 14. In any case, 32 different patterns equivalent of sets marks of 3T to 6T and spaces of 3T to 6T each appear once in the 144 bit recording pattern. In addition, the numbers of symbols '0' and the numbers of symbols '1' included in the 144 bit recording pattern are each 72, and the DSV of the recording pattern equals 0.

If these recording patterns are used, the shift amount of each pattern that is outputted equals the result of summation of shift amounts added a same number of times in the edge shift detection circuit 24. By using such recording patterns, the edge shift amounts of marks in all sets can be determined in one recording and reproduction.

Furthermore, in the recording pattern shown in FIG. 14, the recording pattern is configured to include a 6T mark (or space) on the assumption that recording can be performed with the same recording parameter for marks or spaces of 6T or greater. As shown in FIG. 15, however, a recording pattern such that each pattern appears with equal frequency, and the DSV equals 0 can be created even if a 8T mark (or space) is included in the recording pattern instead of a 6T mark (or space).

The recording pattern suitable to optimization of the recording parameters described above can be stored in advance, for example, in a storage device such as a memory provided in the pattern generation circuit 26. In this case, the optical disk device uses the recording pattern read from the above storage device to carry out test recording for optimizing recording parameters.

A sequence example when record compensation learning is performed in the recording/reproducing device of the present invention using the above recording pattern will now be described.

Figure 16:
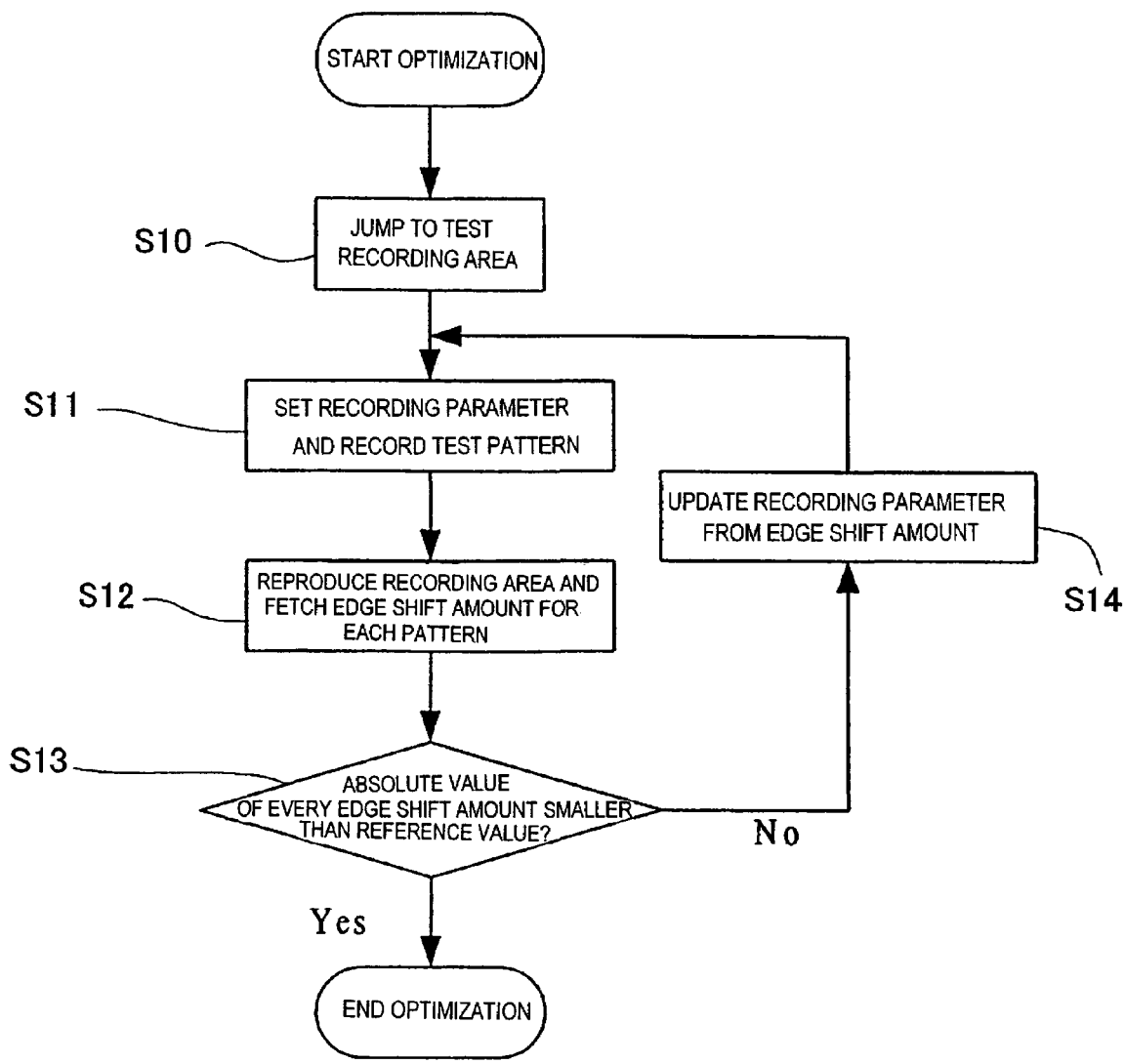
FIG. 16 is a schematic illustration showing a first sequence for optimizing a recording parameter in the recording/reproducing device according to the embodiment of the present invention.

FIG. 16 shows a first sequence example for optimizing recording parameters of the recording/reproducing device of the present invention. First, the optical head 1 is moved (jumped) to a test recording area of a recording medium as shown in step S10. Then, as shown in step S11, a value read from a control track of the recording medium, or a value retained by the device itself in advance is set as an initial value to carry out test recording. At this time, recording may be performed while changing the recording pattern. Here, performing recording while changing the recording pattern means using a plurality of recording patterns to carry out test recording, for example, by selecting a pattern at random from five patterns shown in FIG. 14. Alternatively, it means using similar recording patterns, but changing their record starting positions. In the case of a rewritable recording medium, in particular, some contrivance is made so that a specific pattern is not repeatedly recorded because otherwise the shape of a recording mark formed on the medium is influenced by a previously written recording pattern when the medium is overwritten. In this way, if a recording pattern with high randomness shown in FIG. 14 is used, marks and spaces are formed on the recording medium with a pattern causing no influence to be exerted when the recording medium is overwritten. This eliminate necessity to carry out a primary recording operation when the medium is over written (next test recording is performed), unlike the case of recording being performed with a simple pattern as usual. Thus, the amount of time required for test recording can be reduced.

Then, as shown in step S12, the recording area is reproduced, and an edge shift amount is captured for each set of a mark length and a space length. Specifically, 32 different edge shift detection results R33T, R43T, . . . , R56 and R66L shown in FIG. 12 are captured. Furthermore, if a plurality of edge shift amounts are obtained when test recording is carried out with a different recording pattern for each test area as described above or the like, the average value of those edge shift amounts is calculated, and the value is used as an edge shift amount.

Then, as shown in step S13, no recording parameters are updated to end optimization of the parameters, if the absolute value of every edge shift amount measured for each set of a mark and a space each having a predetermined length is smaller than a reference value A. In addition, as shown in step S14, recording parameters are updated for a set of a mark and a space with the absolute value of the edge shift amount equal to or greater than the reference value A.

In updating the recording parameter selected in this way, whether the value of the recording parameter is to be increased or decreased can be determined from the sign of the detected edge shift amount. Furthermore, an update amount of the recording parameter can be determined from the magnitude of a difference between the detected edge shift amount and the reference value A.

Thereafter, as shown in steps S11 to S13, the updated recording parameter is used to carry out recording and reproduction, and update of the parameter and recording/reproducing are carried out until the detected edge shift amount has a value smaller than the reference value. For the reference value A described above, for example, a reference value such that the jitter between the reproduction signal and data is always 9% or smaller can be used if the absolute value of the edge shift amount is smaller than A.

Figure 17:
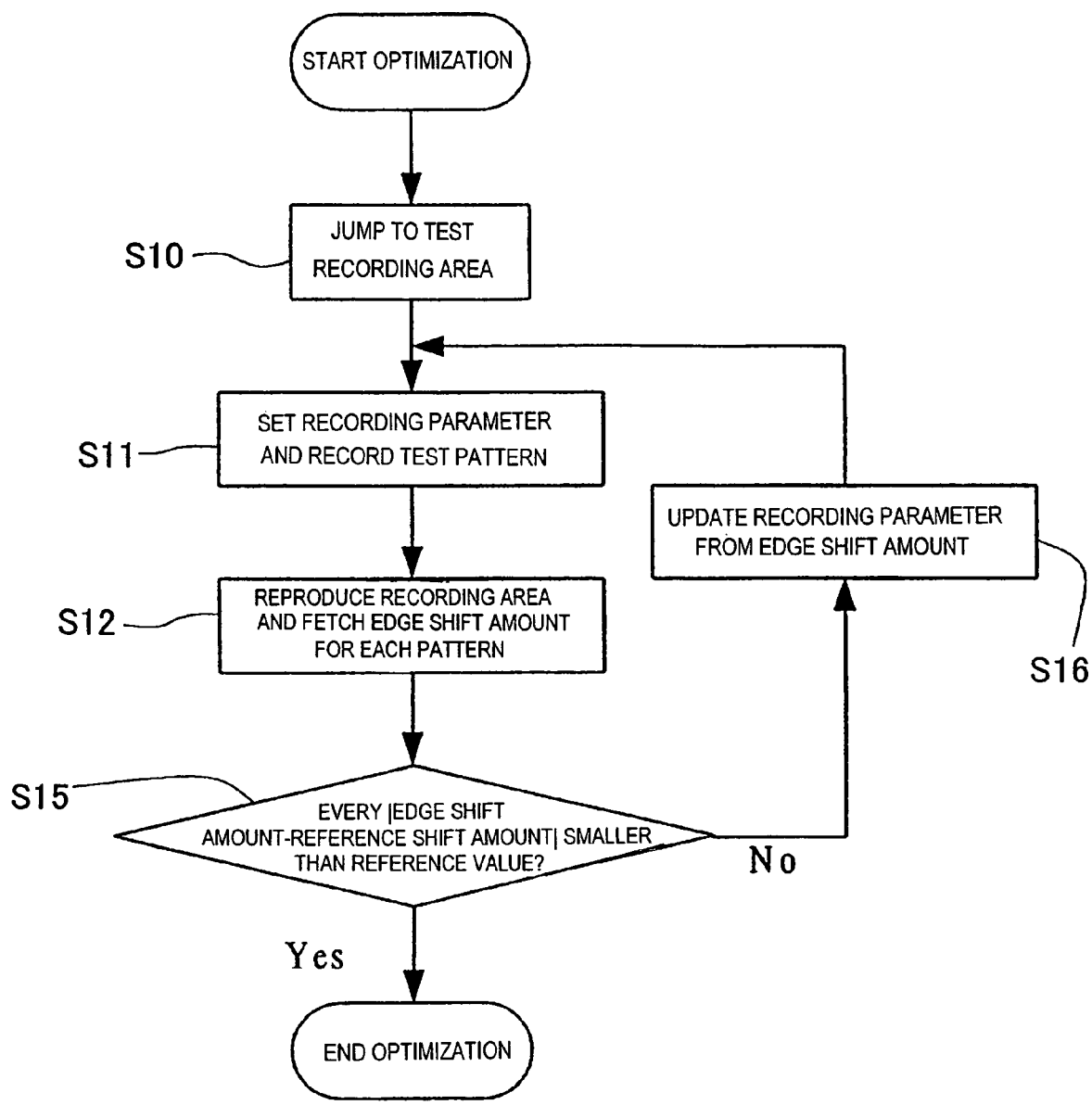
FIG. 17 is a schematic illustration showing a second sequence for optimizing a recording parameter in the recording/reproducing device according to the embodiment of the present invention.

FIG. 17 shows a second sequence example for optimizing recording parameters of the recording/reproducing of the present invention. The sequence example shown in FIG. 16 is different from the sequence example shown in FIG. 17 in that, as an index indicating the edge shift in the mark a difference between the edge shift amount and the reference shift amount is used instead of the edge shift amount itself measured based on the phase difference as described above.

Specifically, at step S15, the absolute value of a difference between the edge shift amount and the reference shift amount is detected for each set of a mark and a space each having a predetermined length, and whether the corresponding recording parameter should be updated or not is determined based on whether the absolute value is smaller than the reference value A or not. If the absolute value of every difference determined for each set of a mark length and a space length is smaller than the reference value A, no recording parameters are updated to end optimization of parameters. In addition, as shown in step S16, recording parameters are updated for a set of a mark and a space with the absolute value of a difference between the edge shift amount and the reference shift amount equal to or greater than the reference value A.

In this embodiment, a shift amount in the rise edge of the 6T mark and 6T space or the fall edge of the 6T space and 6T mark is used as a reference shift amount among 32 different sets of marks of 3T to 6T and spaces of 3T to 6T. Thus, in the case where a shift in the rise edge in a predetermined set of a mark length and a space length is detected, a rise edge shift amount of the 6T mark and 6T space detected at the same time is subtracted from a detected edge shift amount, and whether the absolute value of the difference is equal to or greater than the reference value A is determined. In addition, in the case where a shift in the fall edge in a predetermined set of a mark length and a space length is detected, a rise edge shift amount of the 6T space and 6T mark detected at the same time is subtracted from a detected edge shift amount, and whether the absolute value of the difference is equal to or greater than the reference value A is determined. In this way, a recording parameter for which it is determined that update is required is updated.

Here, the reason why the edge shift amount in the set of a 6T mark and 6T space is used as a reference shift amount is that little edge shift occurs due to heat interference for the set of a 6T space and a 6T mark, and it can be considered that the edge shift amount detected in this set is based on a factor other than the edge shift. If an edge shift occurs in a set other than the set of a 6T space and a 6T mark, for example, the phase of the reproduction signal may be slightly deviated from an appropriate phase. In this case, in the set of a 6T space and a 6T mark, an edge shift amount is detected despite the fact that no edge shift actually occurs. The edge shift amount detected in this way can be considered as an excessive edge shift amount added to an edge shift amount that should be essentially detected. Thus, if using as a reference the edge shift amount in the set of a 6T space and a 6T mark, another edge shift amount is corrected as a relative value (i.e. a difference between these edge shift amounts is determined), a value more appropriately matching an actual edge shift amount can be obtained. Furthermore, an edge shift amount obtained by subtracting this reference shift amount (i.e. the rise edge shift amount of the 6T mark and 6T space, or the fall edge shift amount of the 6T space and 6T mark) is hereinafter referred to as a corrected edge shift amount.

When a recording parameter is changed based on the corrected edge shift amount, whether the value of the recording parameter is to be increased or decreased is determined from the sign of the corrected edge shift amount, and the update amount of the recording parameter is determined according to the magnitude of a difference between the corrected edge shift amount and the reference value A. Using the recording parameter updated in this way, test recording and reproduction are carried out again. In this way, update of the parameter and recording and reproduction are carried out until the corrected edge shift amount detected has a value smaller than the reference value. Furthermore, for the reference value A, for example, a reference value such that the jitter between the reproduction clock and data is always 9% or smaller can be used if the absolute value of the corrected edge shift amount is smaller than A.

Figure 18:
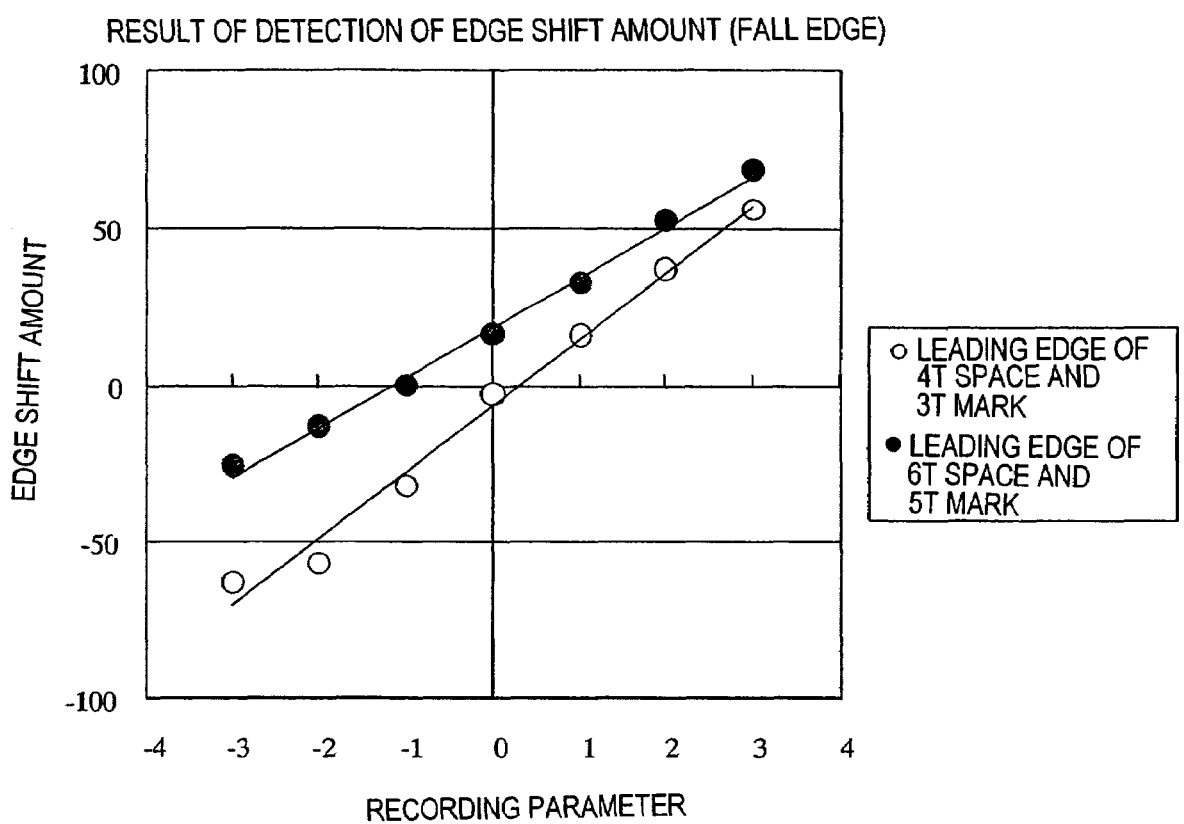
FIG. 18 shows an example in which the relation between the recording parameter and the detected edge shift amount varies depending on the set of a mark length and a space length.

In this way, the update amount of the recording parameter is determined according to the magnitude of a difference between the edge shift amount for which the update amount of the recording parameter is detected and the reference value A, or the magnitude of a difference between the corrected edge shift amount and the reference value A. However, as shown in FIG. 18, the relation between the amount of change in the value of the recording parameter and the detected edge shift amount may vary for each set of a mark and a space each having a predetermined length. This means that the ratio of change in the shape of a mark formed on the recording medium to the amount of change in the recording parameter is different for each set of a mark length and a space length. In this case, it is desirable that the update amount of the recording parameter is changed (i.e. the weight of the update amount is changed) according to the relation. Even for the same edge shift amount (or corrected edge shift amount), the leading edge of the 4T space and 3T mark (graph shown by ●) may be more sensitive to a change in the recording parameter than the leading edge of the 6T space and 5T mark (graph shown by ○) as shown in FIG. 18. In this case, even if a detection result of the same edge shift amount or the same corrected edge shift amount is obtained, it is desirable that the update amount of the recording parameter for the 4T space and 3T mark is smaller. By taking into consideration the fact that the shape of a recording mark formed on the recording medium is different for each set of a mark and a space each having a predetermined length in this way, the recording parameter is more appropriately optimized, and therefore the recording parameter is optimized with a smaller number of times of recording.

Figure 19:
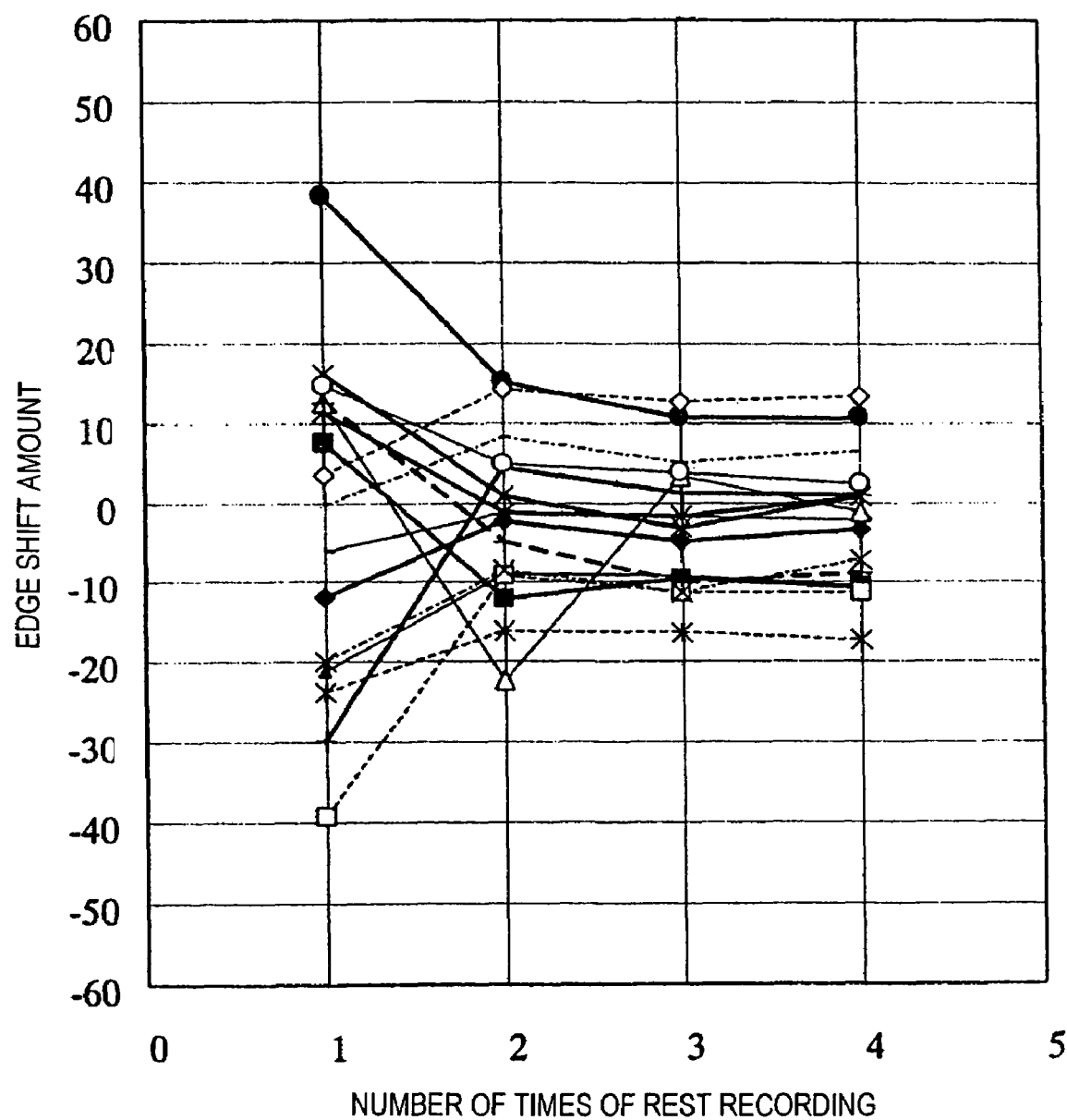
FIG. 19 is a graph showing an edge shift amount being converged as a whole by test recording.

FIG. 19 is a graph showing a relation between the number of times of test recording and the edge shift amount when the correction operation is carried out in this way. As apparent from the figure, edge shift amounts (phase differences) for all sets are determined in first test recording, but only a specific set has an increased edge shift amount. Thus, the recording/reproducing device updates only a recording parameter matching this set, and carries out second test recording. As a result, the edge shift amount decreases as a whole. By repeating this operation, all recording parameters are optimized, and thus edge shift amounts in all sets can be made to converge as a whole. By optimizing only sets of large edge shift amounts instead of performing optimization for each set separately, the operation for correcting the recording parameter can be carried out efficiently.

Figure 20:
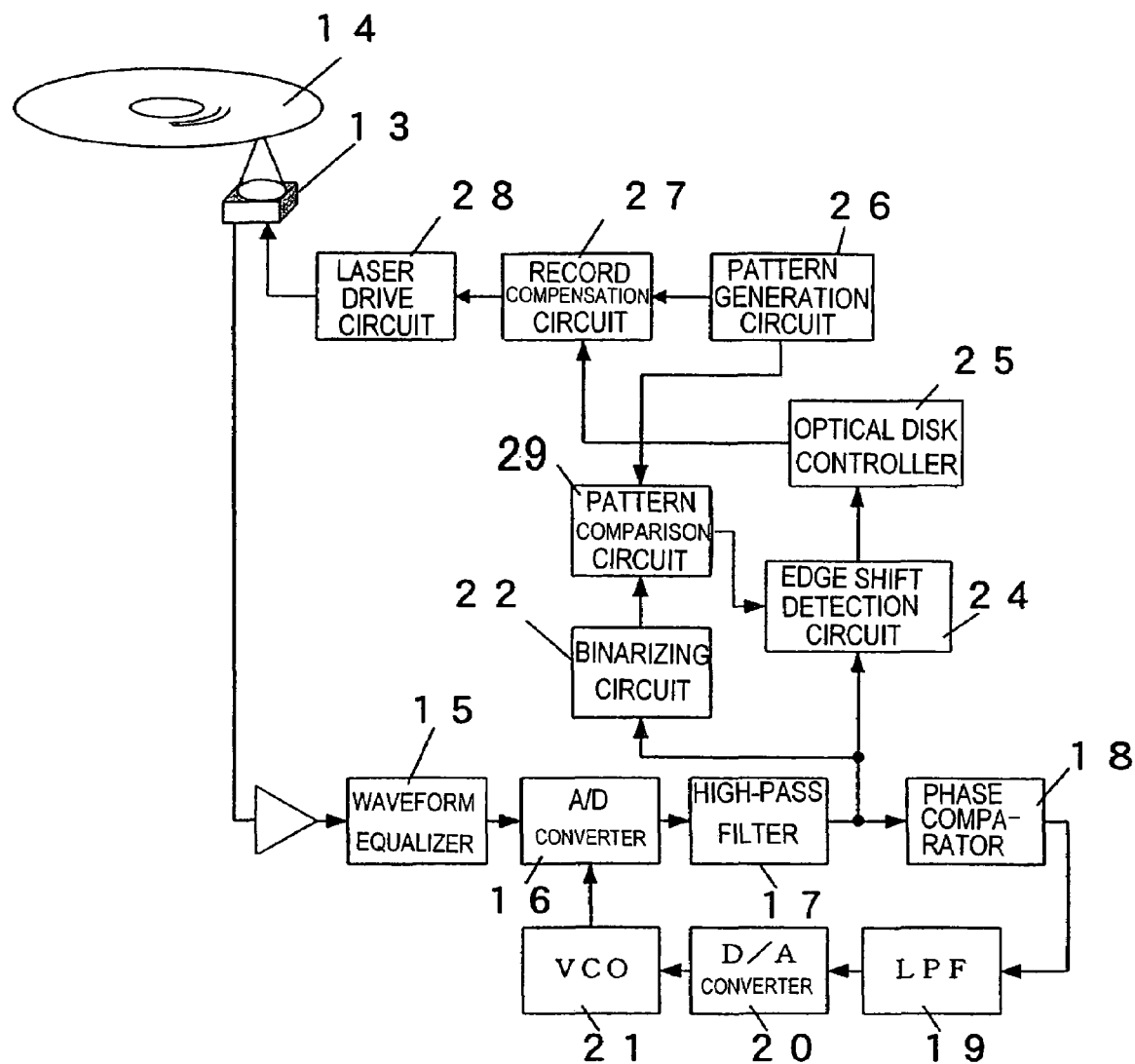
FIG. 20 shows another embodiment of the recording/reproducing device of the present invention.

Furthermore, in the above recording/reproducing device 100 shown in FIG. 5, data is binarized from an output of the high-pass filter 17 in a binarizing circuit, and a pattern is detected from the binarized result, but as shown in FIG. 20, a pattern comparison circuit 29 may compare the binarized result with a recording pattern outputted from the pattern generation circuit to determine an edge shift amount using information of a zero-cross point included in the matched pattern. In this case, erroneous determination in the binarizing circuit has no influence, thus making it possible to determine a more accurate edge shift amount.

Figure 21:
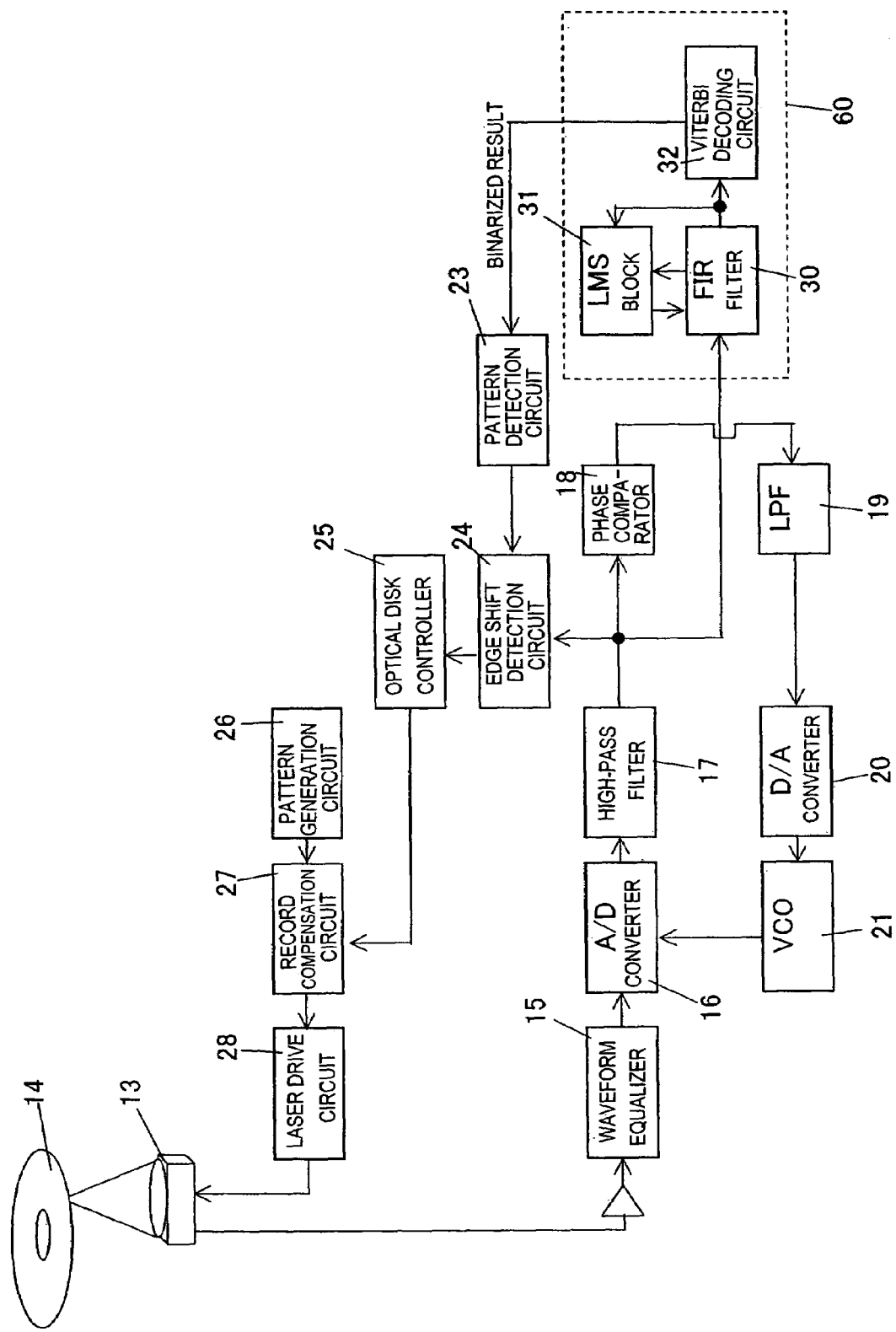
FIG. 21 shows another embodiment of the recording/reproducing device of the present invention.

In addition, as shown in FIG. 21, data may be decoded (binarized) by a PRML circuit 60, and a pattern may be detected based on the result of the decoding. Specifically, the output of the high-pass filter 17 is inputted to an FIR filter 30, and an equalization difference is detected from the output of the FIR filter 30. Based on this equalization difference, adaptive equalization is performed by an LMS block 31 updating a tap factor of the FIR filter 30. Then, a Viterbi decoding circuit 32 estimates a state transition that is most possible from a viewpoint of probability, and thereby outputs a binarized result (decoded data). The pattern detection circuit 23 can detect a pattern using the binarized result of the Viterbi decoding circuit 32, and determine an edge shift amount for each pattern. In this case, a more accurate binarized result can be obtained by the PRML circuit 60 when influences of intersymbol interference and the like are significant or the like, thus making it possible to determine an accurate edge shift amount.

Furthermore, in the embodiment described above, a recording parameter is optimized using a preset recording pattern, but the recording parameter can be optimized using any user data recorded on an optical disk. In this case, by detecting an edge shift amount for each of a plurality of patterns (sets of mark lengths and space lengths) included in the user data, each recording parameter can be appropriately set.

INDUSTRIAL APPLICABILITY

According to the present invention, data recorded with a recording pattern so specified as to include a plurality of sets of mark lengths and space lengths is reproduced, and from the signal reproduced in this way, the edge shift amount of a mark is measured for each set of a mark length and a space length. Consequently, recording parameters that should be changed can be selected. By changing only the recording parameters selected in this way, optimization of all recording parameters can be performed in shorter time.

The invention claimed is:

1. A device for writing data expressed by sets of marks and spaces formed on a recording medium in said recording medium, and/or reading said data from said recording medium, comprising:
    a writing unit for writing on said recording medium predetermined data matching a recording pattern so specified as to include a plurality of contiguous, mutually different sets of mark lengths and space lengths;
    a reading unit for reading said predetermined data from said recording medium to generate a data signal matching said predetermined data;
    an edge shift detector for measuring an edge shift amount of each of said marks formed on said recording medium for each one of said sets of mark lengths and space lengths using said data signal; and
    a record controller for setting a recording parameter for each one of said sets of mark lengths and space lengths based on said measured edge shift amount,
    wherein said recording pattern includes all of the sets of mark lengths and space lengths, the mark lengths ranging from mT to (m+a)T and the space lengths ranging from mT to (m+b)T, a and b each being an integer of 0 or greater, and the shortest mark space and the shortest space length each being represented by mT, m being a predetermined integer of 1 or greater and T being a period of a clock signal, and
    wherein said edge shift detector measures separately an edge shift amount of a leading edge of each said mark and an edge shift amount of a trailing edge of each said mark for each of said sets of mark lengths and space lengths.

2. The device according to claim 1, wherein the device further comprises a clock generator generating a clock signal based on a reproduction signal obtained by reading data recorded on said recording medium,
    and said edge shift amount is detected as a phase difference between said data signal and said clock signal.

3. The device according to claim 2, wherein said clock generator controls said clock signal so that the phase difference between said reproduction signal and said clock signal becomes close to 0 as a whole.

4. The device according to claim 1, wherein said recording pattern has unit patterns each so specified as to include a predetermined one set of a mark length and a space length to set said recording parameter.

5. The device according to claim 1, wherein said edge shift detector accumulates an edge shift amount with a sign for each said set of a mark length and a space length.

6. The device according to claim 1, wherein said edge shift detector outputs an output value matching said edge shift amount for each said set of a mark length and a space length.

7. The device according to claim 6, wherein said record control unit determines whether said output value of said edge shift detector is within a predetermined range or not for each said set of a mark length and a space length, and changes said recording parameter only for said sets of mark lengths and space lengths for which it is determined that said output value is out of said predetermined range.

8. The device according to claim 7, wherein said record control unit determines whether the absolute value of said output value of said edge shift detector is smaller than a predetermined value for each said set of a mark length and a space length.

9. The device according to claim 7, wherein said output value of said edge shift detector, associated with a predetermined one set of a mark length and a space length, is used as a reference value, and said record control unit determines whether a difference between said output value of said edge shift detector and said reference value is within a predetermined range for each said set of a mark length and a space length, and changes said recording parameter only for said sets of mark lengths and space lengths for which it is determined that said difference is out of said predetermined range.

10. The device according to claim 6, wherein said record controller determines whether said recording parameter is to be increased or decreased based on the sign of said output value of said edge shift detector.

11. The device according to claim 10, wherein said record controller determines an increased or decreased amount based on the magnitude of the output value of said edge shift detector.

12. The device according to claim 11, wherein said record controller weights the magnitude of said output value with said increased or decreased amount according to said sets of mark lengths and space lengths when the increased or decreased amount of said recording parameter is determined.

13. The device according to claim 1, wherein the device further comprises a binarizing circuit generating a binarized signal by binarizing said data signal, and
    a specific set of a mark length and a space length in said data signal is identified based on said binarized signal.

14. A device for writing data expressed by sets of marks and spaces formed on a recording medium, and/or reading said data from said recording medium, comprising:

a writing unit for writing on said recording medium predetermined data matching a predetermined recording pattern so specified as to include a plurality of contiguous mutually different sets of mark lengths and space lengths; and an edge shift detector for measuring an edge shift amount of each of said marks recorded on said recording medium based on said predetermined data read from said recording medium, wherein said predetermined recording pattern is specified such that each of a×b×2 of the mutually different sets of mark lengths and space lengths appears once, a shortest mark length and a shortest space length being represented by mT, m being a predetermined integer of 1 or greater, and T being a period of a clock signal, a and b being any integer of 0 or greater, with mark lengths of (m+a)T, space lengths of (m+b)T and polarities determined depending on a leading edge and a trailing edge of said mark, said predetermined recording pattern being further specified so that said plurality of sets of mark lengths and space lengths appear with equal frequency, and a digital sum value of said predetermined recording pattern equals 0.

15. The device according to claim 14, wherein said edge detector measures said edge shift amount for each said set of a mark length and a space length.

16. A recording and reproducing device for writing data expressed by sets of marks and spaces formed on a recording medium, and/or reading said data from said recording medium and for optimizing recording parameters or the marks, the recording and reproducing device including a writing unit for writing on said recording medium, predetermined data matching a recording pattern so specified so as to include a plurality of mutually different sets of mark lengths and space lengths, and a reading unit for reading said predetermined data from said recording medium to generate a data signal matching said predetermined data, said device comprising:

an edge shift detector for measuring an edge shift amount of said mark formed on said recording medium for each of said sets of a mark lengths and a space lengths using said data signal; and a record controller for setting a recording parameter for each of said sets of a mark lengths and a space lengths based on said measured edge shift amount, wherein if a shortest mark length and a shortest space length are each represented by mT, m being a predetermined integer of 1 or greater, and T being a period of a clock signal, said recording pattern is specified to include all the sets of mark lengths of mT to (m+a)T and space lengths of mT to (m+b)T, a and b each being any integer of 0 or greater, said edge shift detector measuring separately the edge shift amount of the leading edge of said mark and the edge shift amount of the trailing edge of said mark for each of said sets of a mark lengths and a space lengths.

17. The device according to claim 16, wherein said recording pattern has units each so specified as to include said recording pattern.

18. The device according to claim 16, wherein said edge shift detector accumulates an edge shift amount with a sign for each of said sets of a mark lengths and a space lengths.

19. The device according to claim 16, wherein said edge shift detector outputs an output value matching said edge shift amount for each of said sets of a mark lengths and a space lengths.

20. The device according to claim 19, wherein said record control unit determines whether said output value of said edge shift detector is within a predetermined range or not for each said set of a mark length and a space length, and changes said recording parameter only for said sets of mark lengths and space lengths for which it is determined that said output value is out of said predetermined range.

21. The device according to claim 20, wherein said record control unit determines whether the absolute value of said output value of said edge shift detector is smaller than a predetermined value for each said set of a mark length and a space length.

22. The device according to claim 20, wherein said output value of said edge shift detector, associated with a predetermined one set of a mark length and a space length, is used as a reference value, and said record control unit determines whether a difference between said output value of said edge shift detector and said reference value is within a predetermined range for each said set of a mark length and a space length, and changes said recording parameter only for said sets of mark lengths and space lengths for which it is determined that said difference is out of said predetermined range.

23. The device according to claim 19, wherein said record controller determines whether said recording parameter is to be increased or decreased based on the sign of said output value of said edge shift detector.

24. The device according to claim 23, wherein said record controller determines an increased or decreased amount based on the magnitude of the output value of said edge shift detector.

25. The device according to claim 23, wherein said record controller weights the magnitude of said output value with said increased or decreased amount according to said sets of mark lengths and space lengths when the increased or decreased amount of said recording parameter is determined.

26. The device according to claim 16, wherein the device further comprises a binarizing circuit generating a binarized signal by binarizing said data signal, and a specific set of a mark length and a space length in said data signal is identified based on said binarized signal.

27. A device for being used in a recording and reproducing device for writing data expressed by sets of marks and spaces formed on a recording medium in said recording medium, and/or reading said data from said recording medium and for optimizing recording parameters or the marks, the recoding and reproducing device includes a writing unit for writing on said recording medium predetermined data matching a predetermined recording pattern so specified as to include a plurality of mutually different sets of mark lengths and space lengths, comprising:

an edge shift detector for measuring the edge shift amount of said mark recorded on said recording medium based on said predetermined data read from said recording medium, wherein if a shortest mark length and a shortest space length are each represented by mT (m is a predetermined integer of 1 or greater, and T is a period of a clock signal), said predetermined recording pattern is so defined that a×b×2 sets (a and b are each any integer of 0 or greater) with mark lengths of m T to (m+a)T, space lengths of mT to (m+b)T and polarities determined depending on the leading edge and trailing edge of said mark each appear once, and said predetermined recording pattern is specified so that said sets of mark lengths and space lengths appear with equal frequency, and a digital sum value of said predetermined recording pattern equals 0.

28. The device according to claim 27, wherein said edge detector measures said edge shift amount for each said set of a mark length and a space length.

* * * * *